(12) United States Patent
Nishimoto

(10) Patent No.: US 6,515,943 B1
(45) Date of Patent: Feb. 4, 2003

(54) INFORMATION STORAGE DEVICE HAVING AN OPTICAL HEAD ASSEMBLY AND A MAGNETIC HEAD ASSEMBLY BOTH MOUNTED UPON A SINGLE CARRIAGE

(75) Inventor: Hideki Nishimoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/159,832

(22) Filed: Sep. 24, 1998

(30) Foreign Application Priority Data

Feb. 16, 1998 (JP) .......................................... 10-032976

(51) Int. Cl.$^7$ .............................................. G11B 11/00
(52) U.S. Cl. .................. 369/13.17; 369/13.21
(58) Field of Search ........................ 369/13, 109, 75.1, 369/14, 75.2, 77.1, 77.2, 78, 215, 244, 44.35, 110, 44.12, 13.17, 13.22, 13.2, 13.35, 300, 13.02, 13.12, 13.14, 13.21, 263, 13.18, 13.19; 360/294.3

(56) References Cited

U.S. PATENT DOCUMENTS

| | | | | |
|---|---|---|---|---|
| 5,416,753 A | * | 5/1995 | Kanazawa et al. | ....... 369/13.17 |
| 5,455,809 A | * | 10/1995 | Naraoka et al. | .............. 369/13 |
| 5,483,504 A | * | 1/1996 | Horita et al. | .................. 369/13 |
| 5,526,328 A | * | 6/1996 | Oshima et al. | ................ 369/13 |
| 5,570,333 A | * | 10/1996 | Katayama | .................. 369/110 |
| 5,581,524 A | * | 12/1996 | Fujino | ..................... 369/44.27 |
| 5,604,719 A | * | 2/1997 | Kakimoto et al. | ............ 369/13 |
| 6,011,673 A | * | 1/2000 | Kanazawa et al. | .......... 360/105 |

FOREIGN PATENT DOCUMENTS

| | | |
|---|---|---|
| JP | 6260148 | 3/1987 |
| JP | 04186503 | 7/1992 |
| JP | 04372752 | 12/1992 |
| JP | 056593 | 1/1993 |
| JP | 0536148 | 2/1993 |
| JP | 05182282 | 7/1993 |
| JP | 07311991 | 11/1995 |
| JP | 08279202 | 10/1996 |
| JP | 09147441 | 6/1997 |

* cited by examiner

*Primary Examiner*—Ali Neyzari
(74) *Attorney, Agent, or Firm*—Greer, Burns & Crain, Ltd.

(57) ABSTRACT

An information storage device having a mechanism for automatically detecting a misalignment between a magnetic head and an optical head and correcting the misalignment. The information storage device includes a carriage, an optical head mounted on the carriage and having an objective lens and an actuator for moving the objective lens, a first driving mechanism for moving the carriage in a first direction, and a magnetic head assembly mounted on the carriage and having a magnetic head. The information storage device further includes a light emitting element mounted on the optical head and a photodetector mounted on the magnetic head assembly for detecting light emitted from the light emitting element. A misalignment between the optical head and the magnetic head is detected by using the photodetector and the light emitted from the light emitting element.

23 Claims, 30 Drawing Sheets

Z-Z: OBJECTIVE LENS MOVING DIRECTION

FIG. 2
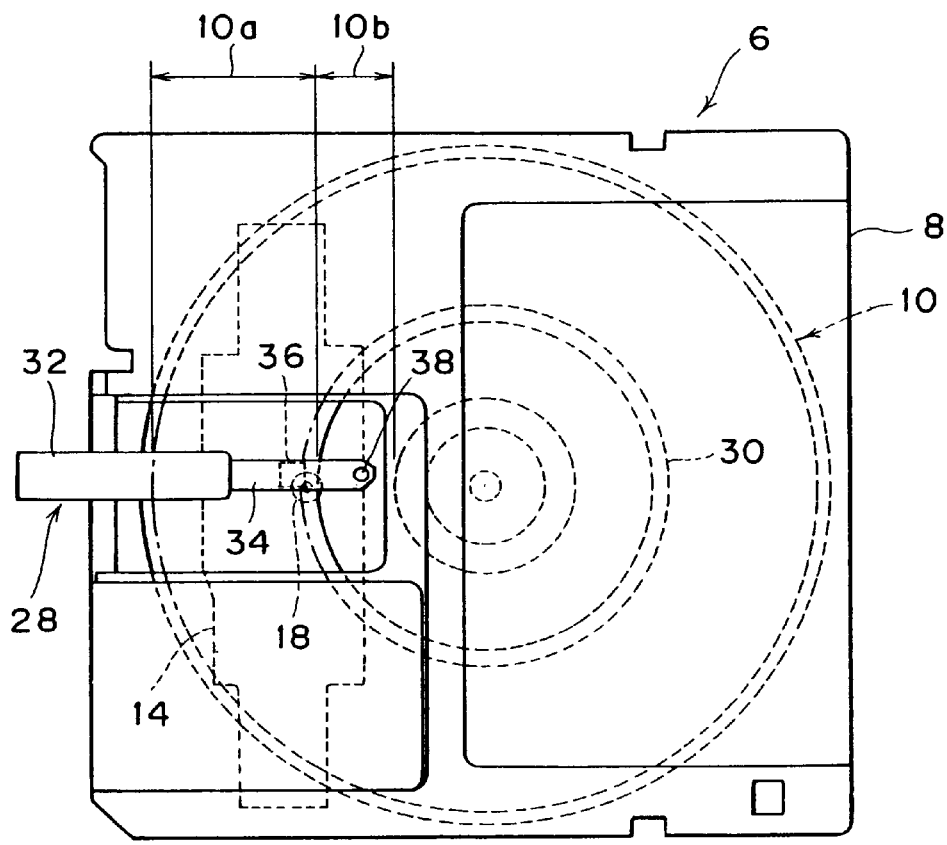
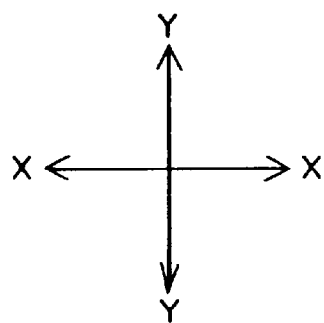
X-X: CARRIAGE MOVING DIRECTION
Y-Y: MAGNETIC HEAD MOVING DIRECTION
    ACTUATOR MOVING DIRECTION

Y-Y: OPTICAL HEAD MOVING DIRECTION

X-X: CARRIAGE MOVING DIRECTION
ACTUATOR MOVING DIRECTION
Y-Y: MAGNETIC HEAD MOVING DIRECTION

X ←→ X
X-X: OPTICAL HEAD MOVING DIRECTION

FIG. 19
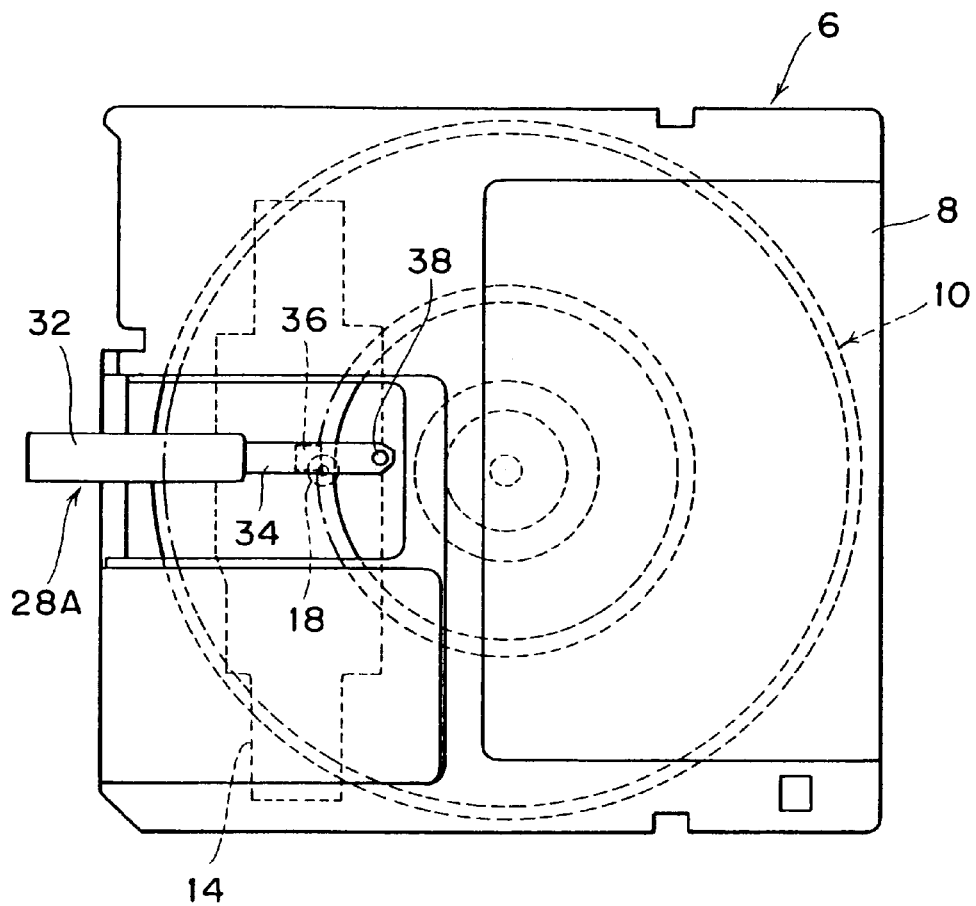
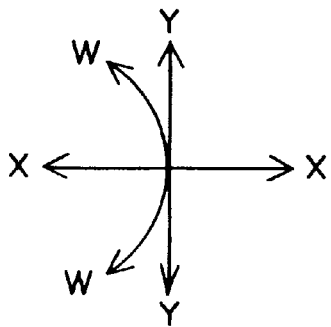
X-X: CARRIAGE MOVING DIRECTION
Y-Y: ACTUATOR MOVING DIRECTION
W-W: MAGNETIC HEAD MOVING DIRECTION

FIG. 23
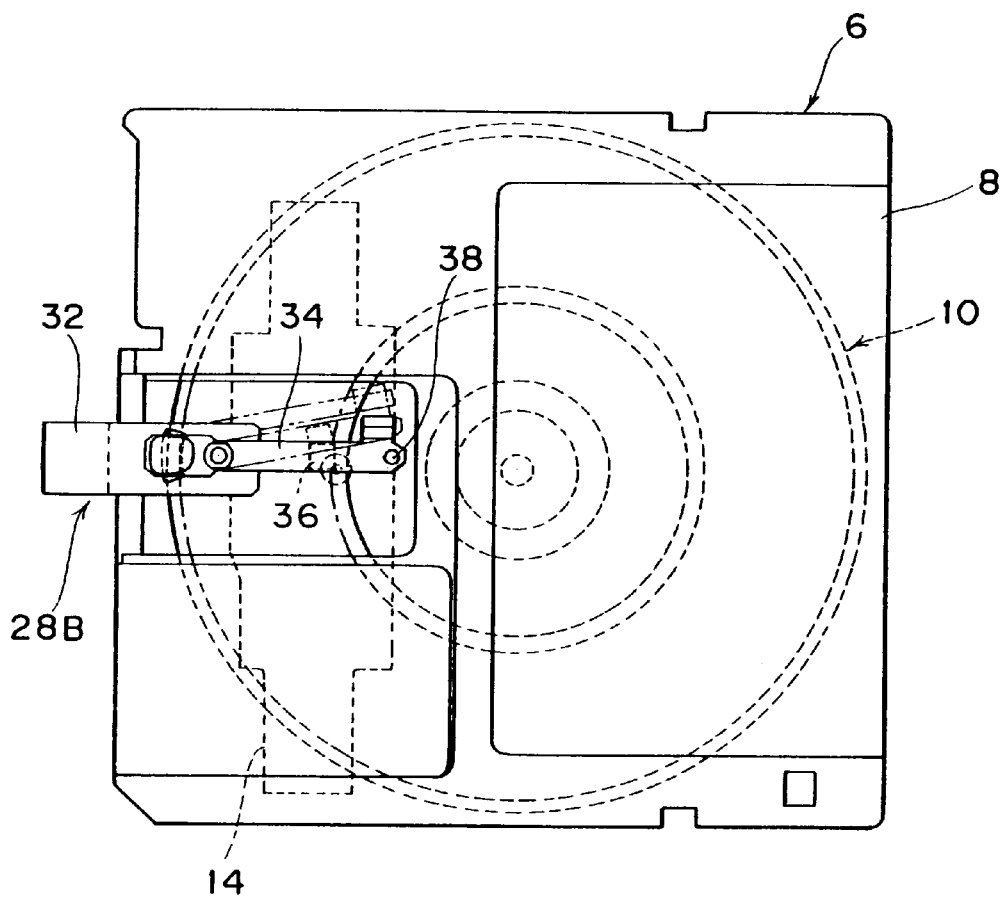
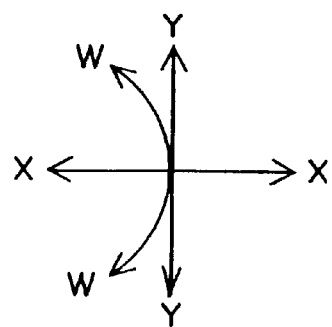
X-X: CARRIAGE MOVING DIRECTION
Y-Y: ACTUATOR MOVING DIRECTION
W-W: MAGNETIC HEAD MOVING DIRECTION

FIG. 27
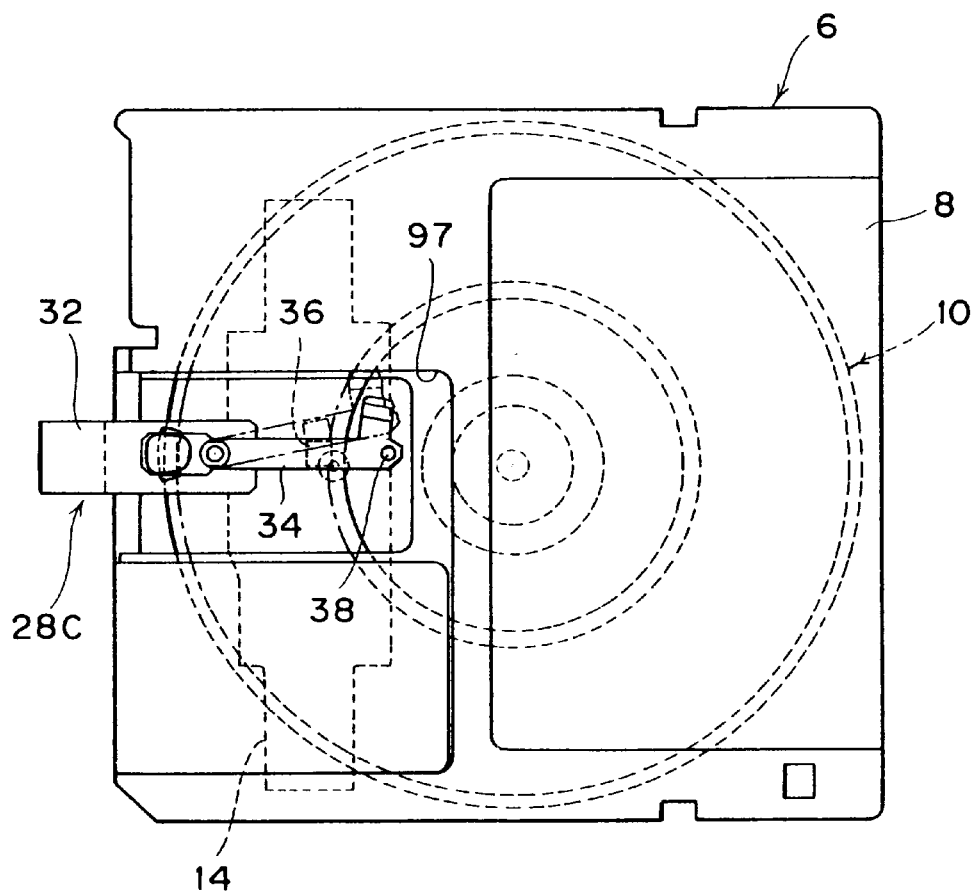
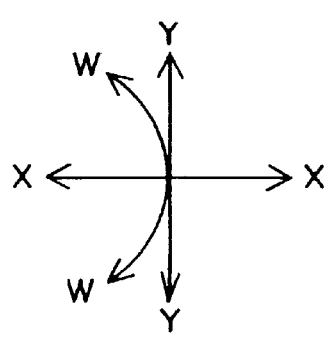
X-X: CARRIAGE MOVING DIRECTION
Y-Y: ACTUATOR MOVING DIRECTION
W-W: MAGNETIC HEAD MOVING DIRECTION X-X, W-W: MAGNETIC HEAD MOVING DIRECTION
(X-X: PIEZOELECTRIC
ELEMENT DRIVE VOLTAGE APPLYING DIRECTION)

INFORMATION STORAGE DEVICE HAVING AN OPTICAL HEAD ASSEMBLY AND A MAGNETIC HEAD ASSEMBLY BOTH MOUNTED UPON A SINGLE CARRIAGE

BACKGROUND OF THE INVENTION

1. Field of the Invention

The present invention relates generally to an information storage device, and more particularly to a magneto-optical disk drive having a mechanism for detecting a misalignment between an optical head and a magnetic head.

2. Description of the Related Art

Increasing a recording density in a magneto-optical disk drive has been progressively required and various systems for information recording have been developed. According to an optical modulation recording system adopted by the ISO standard, a laser beam is modulated with recording data while an external magnetic field is being applied in a fixed direction, thereby recording information on a magneto-optical recording medium. In this optical modulation recording system, an information recording density is limited by the size of a beam spot on the magneto-optical recording medium.

In contrast therewith, according to a magnetic field modulation recording system, an external magnetic field is modulated with recording data while a laser beam having a fixed intensity is being directed onto a magneto-optical recording medium. In this magnetic field modulation recording system, beam spots can be overlapped on the magneto-optical recording medium, so that this system is considered to be more advantageous for high-density recording than the optical modulation recording system. Since the external magnetic field is modulated with the recording data at a high speed in the magnetic field modulation recording system, a flying magnetic head is used as a magnetic head in this system. The flying magnetic head used in this system is substantially the same in shape and operation principle as that used in a magnetic disk drive. When a magneto-optical disk (as the magneto-optical recording medium) is rotated, the magnetic head flies from the surface of the disk at a height of about 10 $\mu$m to record data in a beam spot.

The flying magnetic head has a magnetization range that is narrower than that of an electromagnetic bias field used in a conventional optical modulation recording system. Further, it is expected that the beam spot size formed by an optical head and the magnetization range of the magnetic head will be reduced more in response to future higher-density recording. To attain high-density recording, the optical head and the magnetic head must be precisely aligned with each other. In a conventional magnetic field modulation recording type of magneto-optical disk drive, the optical head and the magnetic head are aligned once in assembling the disk drive, and the disk drive is not provided with a mechanism for automatically adjusting the relative positions of the optical head and the magnetic head to correct a misalignment between the optical head and the magnetic head due to thermal deformation after assembling the disk drive.

Japanese Patent Laid-open No. Hei 5-6593 discloses a magneto-optical disk drive having such a mechanism for correcting a misalignment between the optical head and the magnetic head. In the magneto-optical disk drive disclosed in this publication, the magnetic head is moved completely independently of the optical head. Accordingly, the magnetic head requires the same operational distance as that of the optical head, causing a possibility of enlargement of an actuator. Further, misalignment detecting means is located at the rear ends of the magnetic head and the optical head, that is, on the same side as a fixed optical system having a semiconductor laser. Accordingly, a degree of freedom of design of the fixed optical system is reduced by the location of this detecting means. This disadvantage also makes it difficult to reduce the size of the disk drive.

Thus, there has not been proposed a magnetic field modulation type of magneto-optical disk drive having a misalignment correcting mechanism for automatically detecting a misalignment between the magnetic head and the optical head without enlarging the size of the disk drive. It is accordingly greatly important to provide a misalignment correcting mechanism for automatically detecting a misalignment between the magnetic head and the optical head with a simple structure in response to future higher-density recording.

In addition, the magnetic head is kept flying over the magneto-optical disk surface at a microscopic height during operation of the disk drive, so that there is always the possibility that the magnetic head may collide with the disk to cause head crash. No prior art disk drive of this kind especially has a mechanism for preventing or reducing the possibility of head crash of the magnetic head. Accordingly, it is also greatly important to provide a mechanism for preventing a collision of the magnetic head with the disk during operation of the disk drive.

SUMMARY OF THE INVENTION

It is therefore an object of the present invention to provide an information storage device having a mechanism for automatically detecting a misalignment between a magnetic head and an optical head and correcting the misalignment.

It is another object of the present invention to provide an information storage device having a mechanism for preventing a collision of a magnetic head with a disk during operation of the device to improve the reliability.

In accordance with an aspect of the present invention, there is provided an information storage device comprising a carriage; an optical head mounted on said carriage, said optical head having an objective lens and an actuator for moving said objective lens; first driving means for moving said carriage in a first direction; a magnetic head assembly mounted on said carriage and having a magnetic head; a light emitting element mounted on said optical head; and a photodetector mounted on said magnetic head assembly for detecting light emitted from said light emitting element; a misalignment between said optical head and said magnetic head being detected by using said photodetector and said light emitted from said light emitting element.

In general, a magneto-optical disk as an information recording medium has an inner-circumferential transparent portion where a transparent substrate is exposed with no magnetic coating applied. Accordingly, the misalignment between the optical head and the magnetic head is detected when the light emitting element and the photodetector are located at a position corresponding to the inner-circumferential transparent portion of the magneto-optical disk loaded into the information storage device. The information storage device further comprises second driving means for moving the magnetic head to correct the misalignment between the optical head and the magnetic head. Preferably, the second driving means is provided by a voice coil motor consisting of a coil and a permanent magnet. In one preferred embodiment, the magnetic head assembly includes a head arm and a suspension elastically supported to the head arm, and the magnetic head is mounted on the suspension.

In another preferred embodiment, the magnetic head assembly includes a head arm and a suspension rotatably supported to the head arm. Preferably, in this case, the information storage device further comprises a mechanism for lifting the magnetic head from the disk when the suspension is rotated a given angle or more relative to the head arm. This lifting mechanism keeps lifting the magnetic head from the disk during standby and during reading data recorded on the disk, whereas allowing the magnetic head to move over the disk surface at a given flying height only during writing data onto the disk.

In accordance with another aspect of the present invention, there is provided an information storage device comprising a carriage; a laser light source for emitting a laser beam; an optical head mounted on said carriage, said optical head having an objective lens, a first beam raising mirror for reflecting a first part of said laser beam toward said objective lens and transmitting a second part of said laser beam, an actuator for moving said objective lens, and a second beam raising mirror for totally reflecting said second part of said laser beam transmitted through said first beam raising mirror; first driving means for moving said carriage in a first direction; a magnetic head assembly mounted on said carriage and having a magnetic head; and a photodetector mounted on said magnetic head assembly for detecting said second part of said laser beam reflected by said second beam raising mirror; a misalignment between said optical head and said magnetic head being detected by using said photodetector and said second part of said laser beam reflected by said second beam raising mirror.

In accordance with a further aspect of the present invention, there is provided an information storage device comprising a carriage; a laser light source for emitting a laser beam; an optical head mounted on said carriage, said optical head having an objective lens, a beam raising mirror for totally reflecting said laser beam toward said objective lens, and an actuator for moving said objective lens; first driving means for moving said carriage in a first direction; a magnetic head assembly mounted on said carriage and having a magnetic head; and a photodetector mounted on said magnetic head assembly at a position adjacent to said magnetic head for detecting said laser beam reflected by said beam raising mirror and transmitted through said objective lens; a misalignment between said optical head and said magnetic head being detected by using said photodetector and said laser beam transmitted through said objective lens.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 2 is a plan view showing an essential part of a first preferred embodiment of the present invention;

FIG. 19 is a plan view showing an essential part of a third preferred embodiment of the present invention;

FIG. 23 is a plan view showing an essential part of a fourth preferred embodiment of the present invention;

FIG. 27 is a plan view showing an essential part of a fifth preferred embodiment of the present invention;

DETAILED DESCRIPTION OF THE PREFERRED EMBODIMENTS

Figure 1:
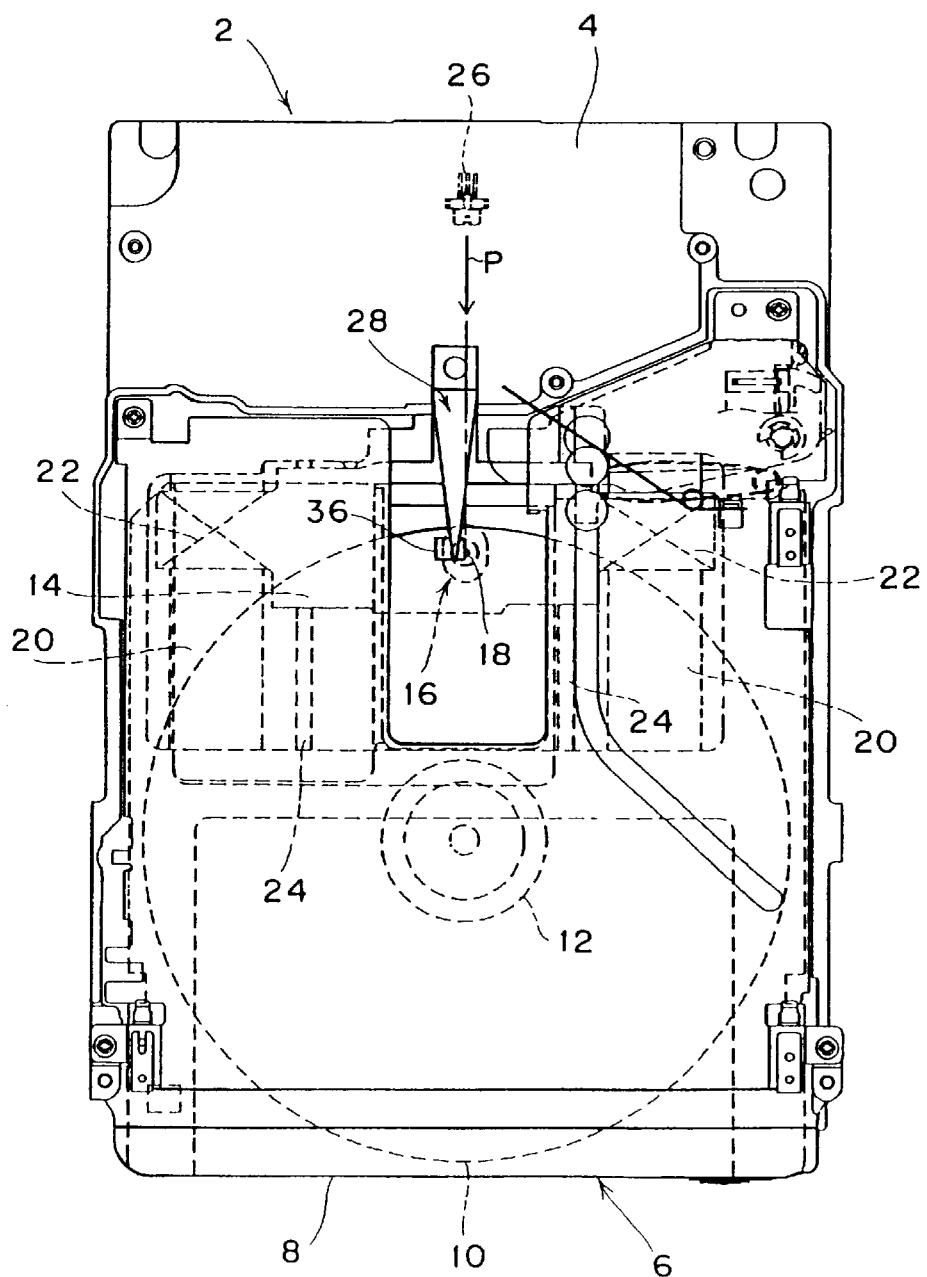
FIG. 1 is a plan view showing the configuration of a magneto-optical disk drive as a whole according to the present invention.

Some preferred embodiments of the present invention will now be described with reference to the attached drawings. In all the preferred embodiments, substantially the same parts will be denoted by the same reference numerals.

Referring to FIG. 1, there is shown a schematic plan view of a magneto-optical disk drive 2 according to the present invention. Reference numeral 4 denotes a disk enclosure or base of the magneto-optical disk drive 2. A pair of magnetic circuits 20, a pair of guide rails 24, a semiconductor laser 26, etc. are mounted in the disk enclosure 4.

FIG. 1 shows a condition where a magneto-optical disk cartridge 6 is fully loaded in the magneto-optical disk drive 2. A magneto-optical disk 10 is contained in a cartridge shell (cartridge case) 8 of the disk cartridge 6. In this condition shown in FIG. 1, the magneto-optical disk 10 is clamped to a spindle motor 12 through an opening formed through the cartridge shell 8. Reference numeral 14 denotes a carriage for carrying an optical head 16. The carriage 14 is provided with a pair of coils 22 at positions corresponding to the magnetic circuits 20. The magnetic circuits 20 and the coils 22 constitute a voice coil motor (VCM). By passing a current through the coils 22, the carriage 14 is moved in the radial direction of the magneto-optical disk 10 as being guided by the pair of guide rails 24. The optical head 16 has an objective lens 18. Reference numeral 28 denotes a magnetic head assembly having a magnetic head 36. The magnetic head assembly 28 is mounted at its base end portion on the carriage 14.

In recording information, the semiconductor laser (LD) 26 and the magnetic head 36 are driven. A laser beam emitted from the semiconductor laser 26 in the direction of an arrow P shown in FIG. 1 is reflected in a direction perpendicular to the sheet plane of FIG. 1 by a beam raising mirror or 45° right angle prism (not shown) and is next focused onto the disk 10 by the objective lens 18. At this time, an external magnetic field is applied by the magnetic head 36, and that field is magnetically modulated to thereby form a recording pit (recording mark) on the disk 10. When a current is supplied to the pair of coils 22 in recording or reproducing information, the carriage 14 is moved to seek a target recording track of the disk 10.

Referring to FIG. 2, there is shown a schematic plan view of a first preferred embodiment of the present invention. In this figure and the subsequent figures, only essential parts of the magneto-optical disk drive for the description of the present invention are shown, and the other parts of the magneto-optical disk drive are not shown for simplicity of illustration. The magneto-optical disk 10 contained in the cartridge shell 8 has a recording portion 10a where a magnetic coating is applied on a transparent substrate and an inner-circumferential transparent portion 10b where the transparent substrate is exposed. The recording portion 10a has a plurality of recording tracks 30.

Figure 3:
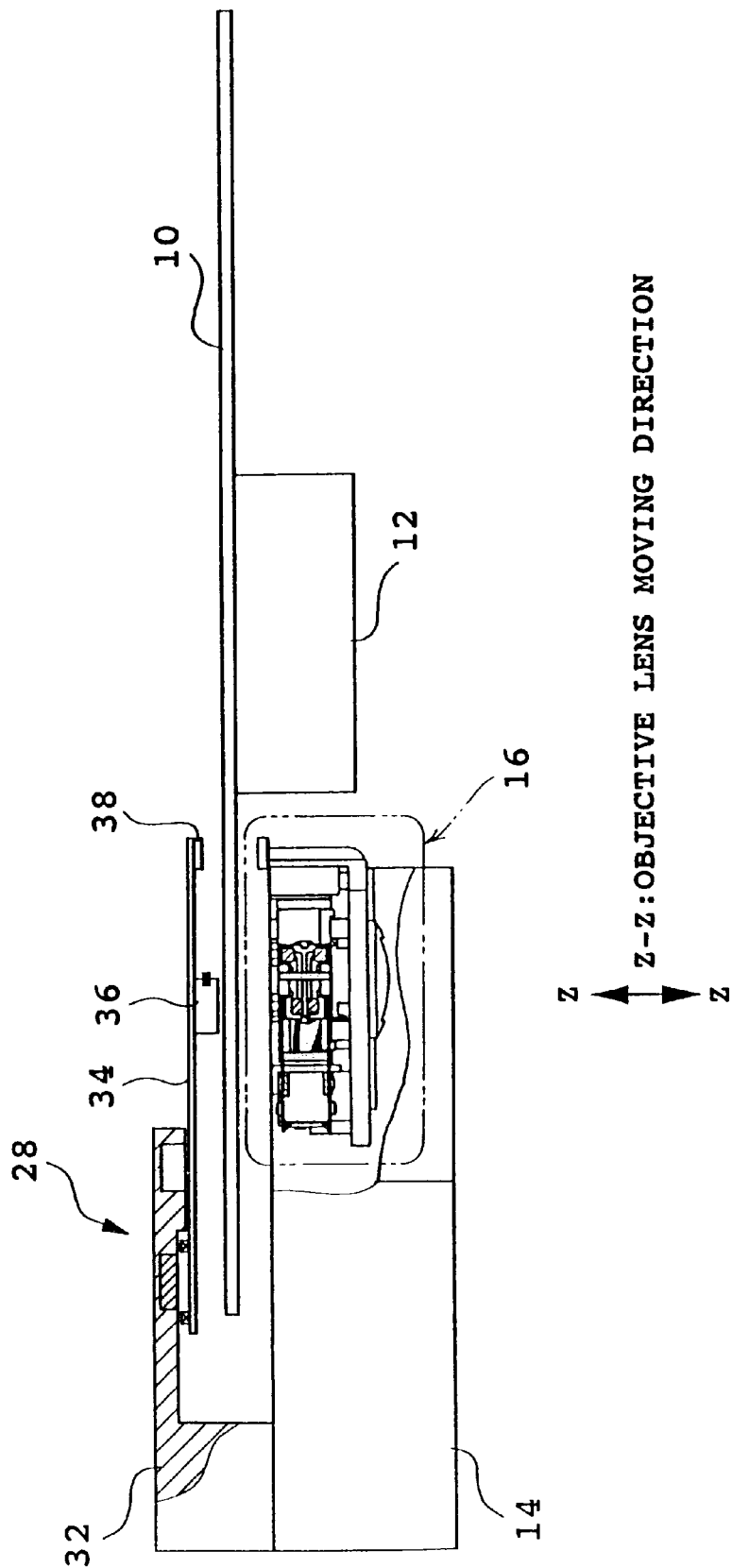
FIG. 3 is a partially-sectional elevation of the first preferred embodiment.
Figure 5:
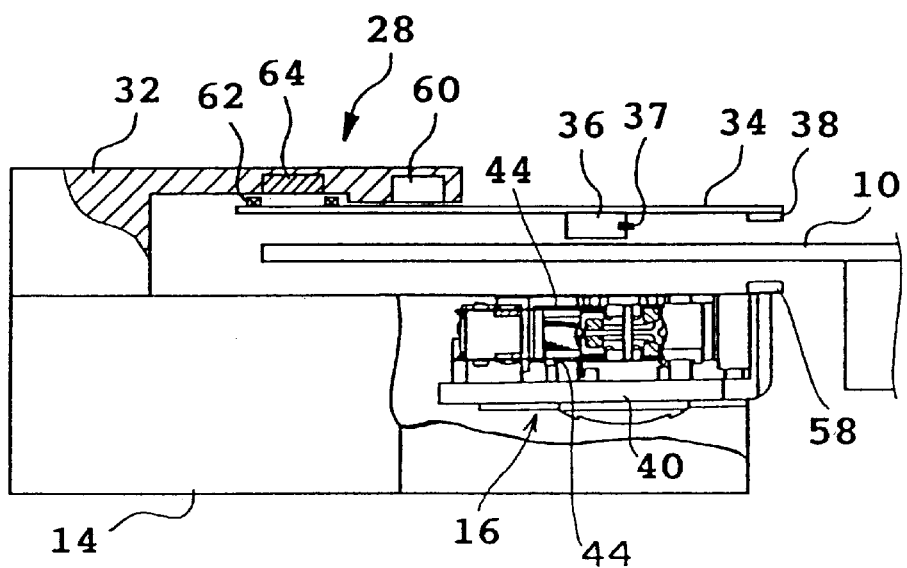
FIG. 5 is an enlarged partially-sectional elevation showing an essential part of the first preferred embodiment.
Figure 8:
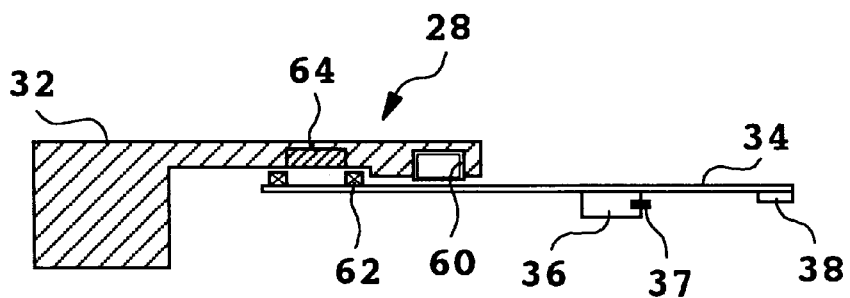
FIG. 8 is a cross section taken along the line 8—8 in FIG. 7.

Reference numeral 28 denotes a magnetic head assembly. As shown in FIGS. 3 and 5, the magnetic head assembly 28 is fixed at its base end portion to the carriage 14. The magnetic head assembly 28 includes a head arm 32 fixed to the carriage 14 and a suspension 34 elastically supported to the head arm 32. As best shown in FIGS. 5 and 8, a magnetic head 36 having an electromagnetic transducer 37 is mounted on an intermediate portion of the suspension 34, and a photodetector 38 is mounted on a front end portion of the suspension 34.

Figure 4:
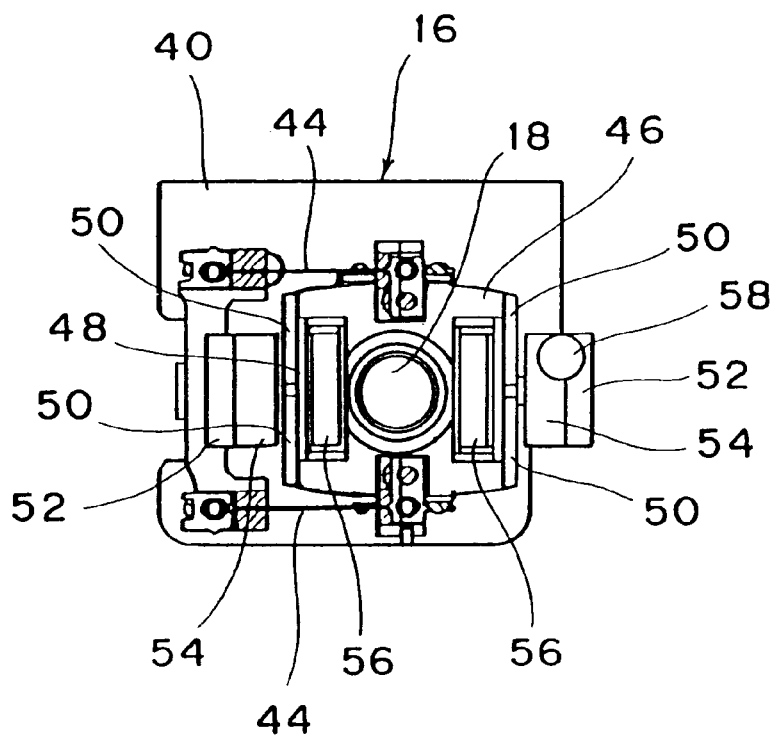
FIG. 4 is a plan view of an optical head used in the first preferred embodiment.
Figure 6:
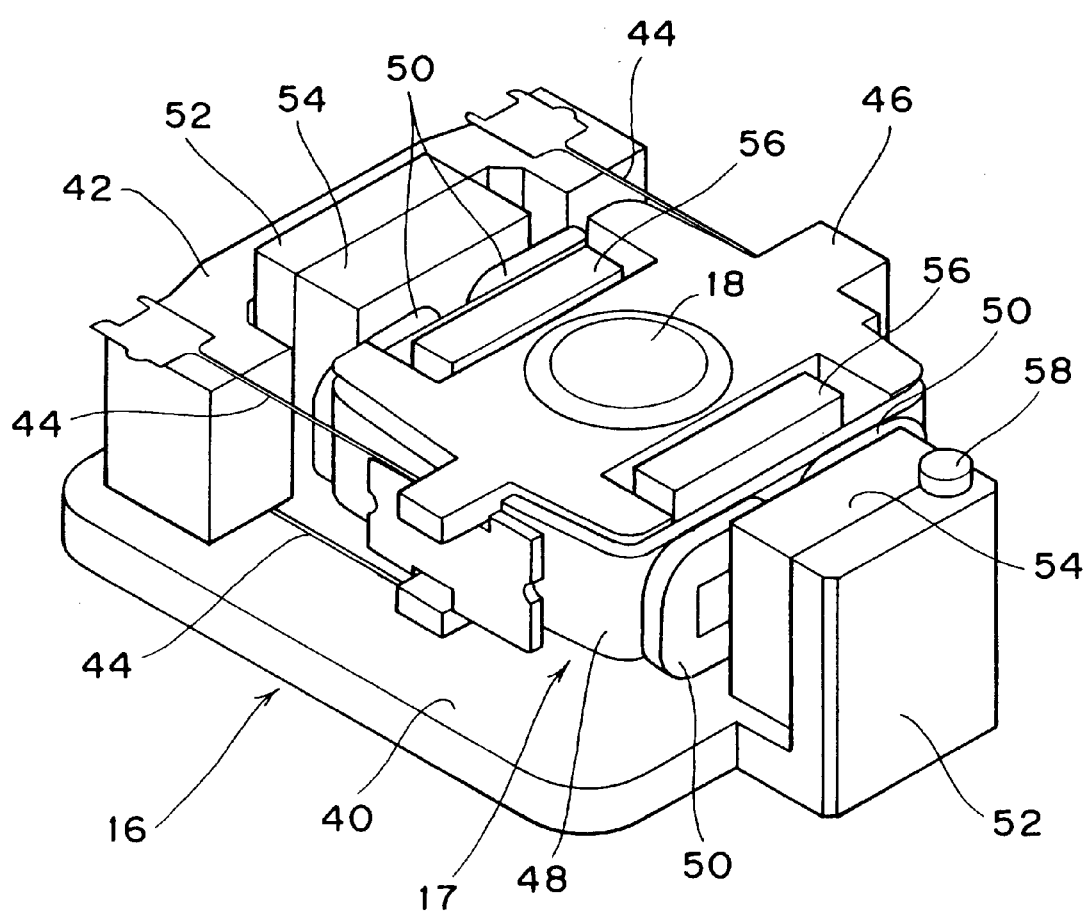
FIG. 6 is a perspective view of the optical head.

The optical head 16 mounted on the carriage 14 is located under the magneto-optical disk 10. As best shown in FIGS. 4 and 6, the optical head 16 has an actuator base 40 fixed to the carriage 14, and a block 42 is fixed by crimping to the actuator base 40. A lens holder 46 for holding the objective lens 18 is supported to the block 42 by four wires 44 in a cantilever fashion.

A focus coil 48 is wound around the lens holder 46, and four track coils 50 are mounted on the focus coil 48. The actuator base 40 is integrally formed with a pair of outer yokes 52, and a permanent magnet 54 is mounted on each outer yoke 52. Further, a pair of inner yokes 56 are fixed to the actuator base 40 so as to be opposed to the permanent magnet 54 with the focus coil 48 and the track coils 50 sandwiched therebetween. A light emitting element 58 such as a light emitting diode (LED) is mounted on the top of one of the outer yokes 52. Thus, the four wires 44 supporting the lens holder 46, the focus coil 48, the track coils 50, the yokes 52 and 56, and the permanent magnet 54 constitute an actuator 17 for moving the objective lens 18.

Figure 7:
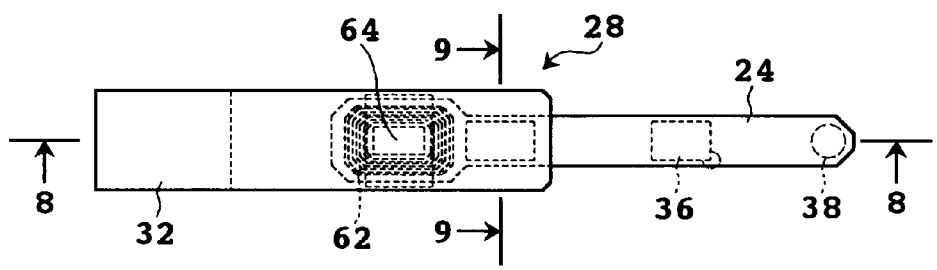
FIG. 7 is a top plan view of a magnetic head assembly used in the first preferred embodiment.
Figure 9:
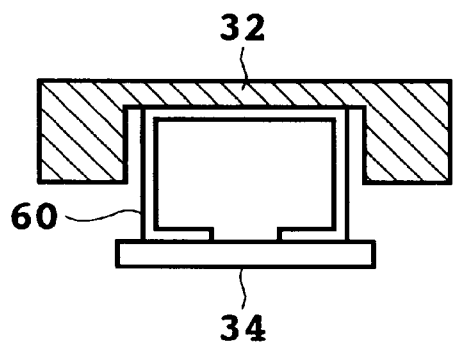
FIG. 9 is a cross section taken along the line 9—9 in FIG. 7.
Figure 10:
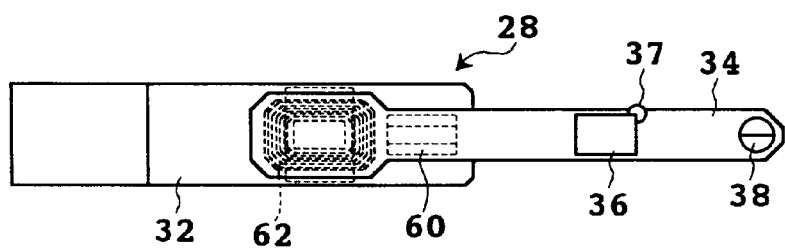
FIG. 10 is a bottom plan view of the magnetic head assembly.

FIG. 7 shows a top plan view of the magnetic head assembly 28, and FIG. 10 shows a bottom plan view of the magnetic head assembly 28. As shown in FIG. 8, the magnetic head assembly 28 includes a head arm 32 fixed at its base end portion to the carriage 14 and a suspension 34 elastically supported through a leaf spring 60 to the head arm 32. The leaf spring 60 is bent as shown in FIG. 9 and is fixed to the head arm 32 and the suspension 34 by adhesion or the like. A coil 62 is fixed to the base end portion of the suspension 34, and a permanent magnet 64 is mounted on the head arm 32 at a position opposed to the coil 62. The coil 62 and the permanent magnet 64 constitute a voice coil motor (VCM).

Figure 11:
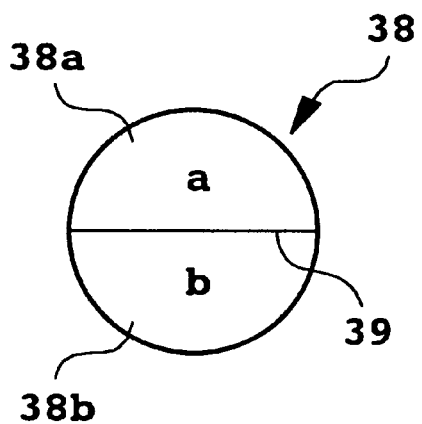
FIG. 11 is an enlarged plan view of a photodetector used in the first preferred embodiment.

As shown in FIG. 11, the photodetector 38 mounted on the front end portion of the suspension 34 is composed of two portions 38a and 38b partitioned by a division line 39. Thus, a misalignment between the optical head 16 and the magnetic head 36 is detected by detecting a light beam emitted from the light emitting element 58. That is, letting a and b denote light quantities received by the two portions 38a and 38b of the photodetector 38, respectively, the misalignment between the optical head 16 and the magnetic head 36 is detected by measuring a difference (a–b) between the light quantities a and b.

The misalignment between the optical head 16 and the magnetic head 36 will now be described in detail. The optical head 16 and the magnetic head 36 are so designed as to be opposed to each other in assembly. However, with an increase in recording density, the beam spot on the magneto-optical disk 10 is reduced and the external magnetic field must be applied in a narrower region, so that even a small misalignment between the optical head 16 and the magnetic head 36 produces recording error. Target relative positions of the optical head 16 and the magnetic head 36 in aligning them are set to the center of the objective lens 18, i.e., the center of the beam spot and the center of a coil in the magnetic head 36, i.e., the center of a magnetic pole in the magnetic head 36 (the center of a magnetic gap in the magnetic head 36 in the case of an inductive head), because coincidence in position between the beam spot and the external magnetic field makes it possible to realize perfect recording.

To realize the above target relative positions of the optical head 16 and the magnetic head 36 in aligning them by using the photodetector 38, the position of the photodetector 38 must be set with high accuracy. In this preferred embodiment, the current being passed through the coil 62 is adjusted in both direction and magnitude according to the difference (a-b) between the light quantities a and b. When the current according to the difference (a-b) is passed through the coil 62, the suspension 34 and the magnetic head 36 are moved together in a direction perpendicular to a moving direction of the carriage 14.

As shown in FIG. 2, the carriage 14 is moved in an X—X direction, and the magnetic head 36 is moved in a Y—Y direction perpendicular to the moving direction X—X of the carriage 14. Further, the wires 44 supporting the lens holder 46 extend in the X—X direction as shown in FIG. 4, and the actuator 17 for the optical head 16 is moved in the Y—Y direction by passing a current through the track coils 50 to move the objective lens 18 in the Y—Y direction. Further, by passing a current through the focus coil 48, the objective lens 18 is moved in a Z—Z direction as shown in FIG. 3.

Figure 12:
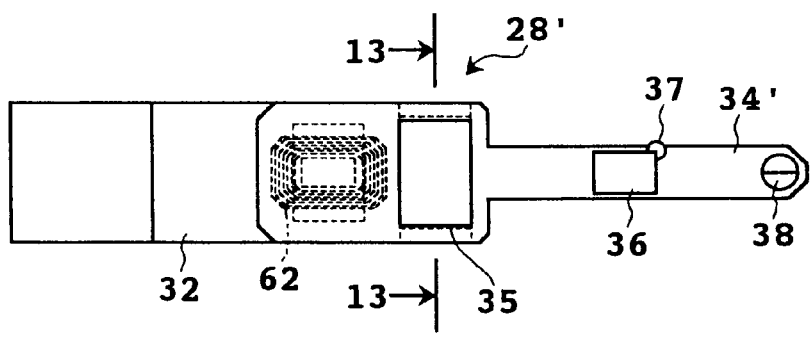
FIG. 12 is a bottom plan view of a magnetic head assembly showing a modification of the first preferred embodiment.
Figure 13:
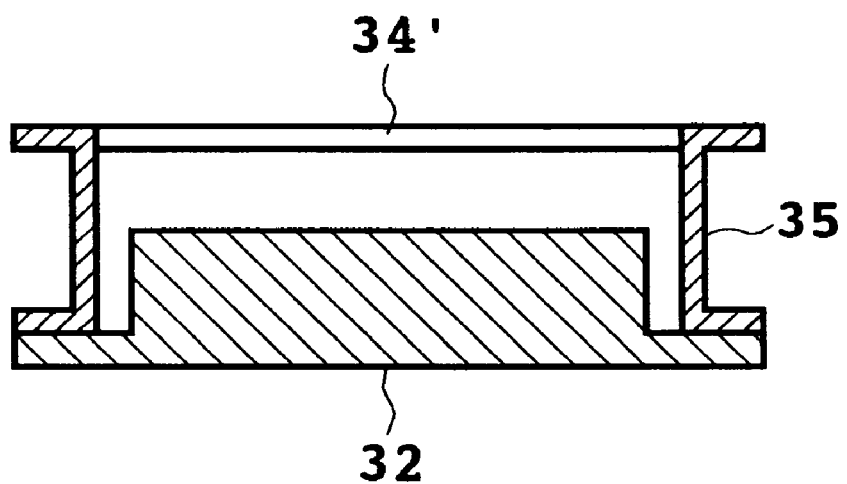
FIG. 13 is a cross section taken along the line 13—13 in FIG. 12.

Referring to FIG. 12, there is shown a bottom plan view of a magnetic head assembly 28' as a modification of the first preferred embodiment. The magnetic head assembly 28' has a suspension 34' formed of stainless steel. The suspension 34' is punched at its base end portion to form a bent portion 35. The bent portion 35 is fixed to the head arm 32. By use of the bent portion 35 of the suspension 34', the leaf spring 60 used in the first preferred embodiment can be eliminated.

Figure 14:
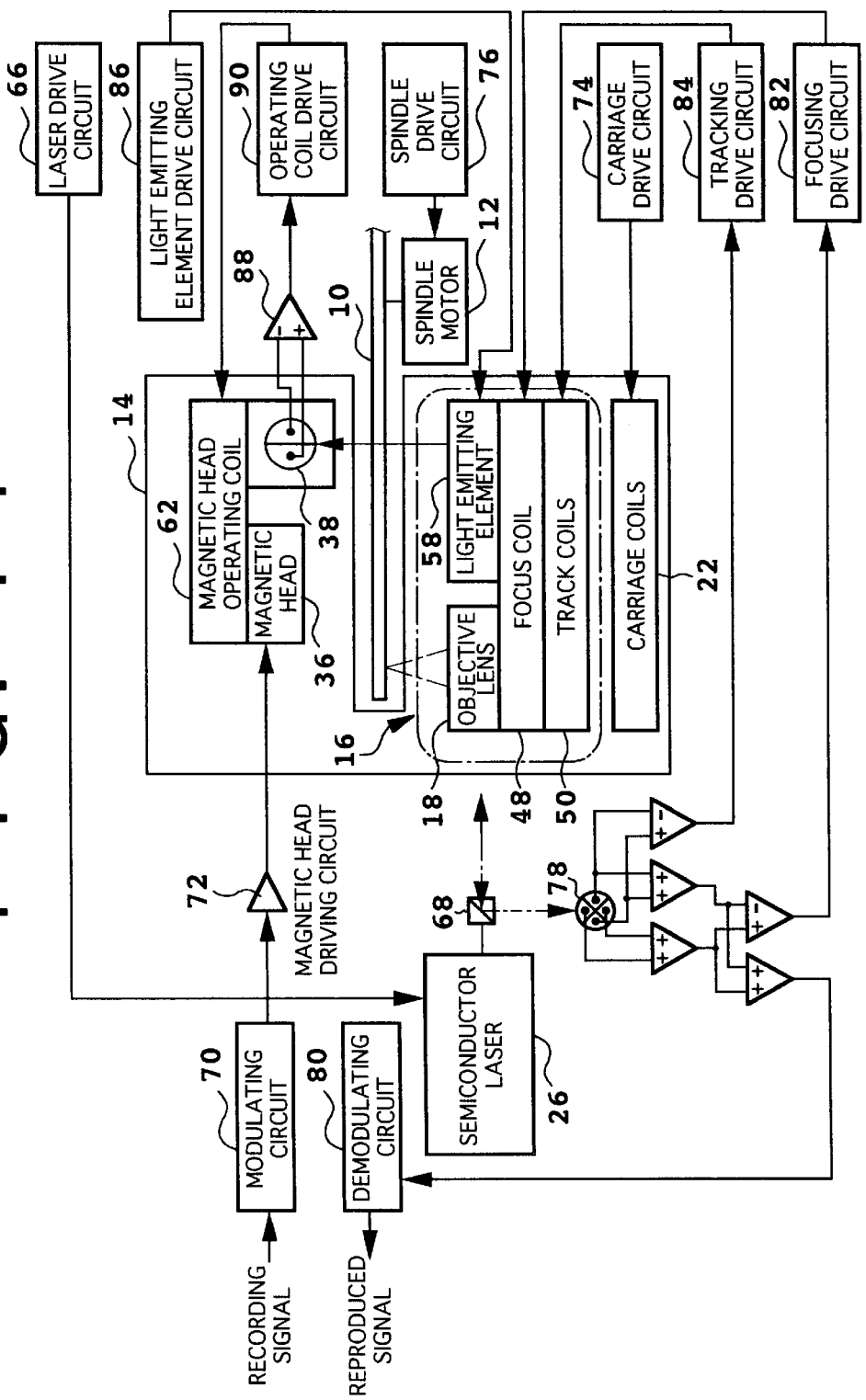
FIG. 14 is a block diagram showing a control circuit in the first preferred embodiment.

The control operation of the first preferred embodiment will now be described with reference to FIG. 14 showing a block diagram of a control circuit for the magneto-optical disk drive. The spindle motor 12 is driven by a spindle drive circuit 76 to rotate the magneto-optical disk 10 at a high speed. The semiconductor laser 26 is driven by a laser drive circuit 66 to emit a laser beam having a constant intensity. The laser beam emitted from the semiconductor laser 26 is transmitted through a beam splitter 68 and is next focused onto the magneto-optical disk 10 by the objective lens 18. On the other hand, a recording signal is input into a modulating circuit 70, which in turn drives a magnetic head drive circuit 72 according to the recording signal. The magnetic head drive circuit 72 drives the magnetic head 36 to apply an external magnetic field modulated with the recording signal to the magneto-optical disk 10. As a result, a recording pit according to the recording signal is formed in a beam spot on the magneto-optical disk 10.

The light emitting element 58 is driven by a light emitting element drive circuit 86. In writing data, light from the light emitting element 58 is detected by the photodetector 38, and the difference between light quantities received by the two portions 38a and 38b is computed by a comparator 88 to thereby detect a misalignment between the optical head 16 and the magnetic head 36. Then, a current is passed through the magnetic head operating coil 62 by an operating coil drive circuit 90 according to an output from the comparator 88 to thereby move the magnetic head 36 in the Y—Y direction shown in FIG. 2, thus correcting the misalignment between the magnetic head 36 and the optical head 16. In this manner, the misalignment between the optical head 16 and the magnetic head 36 is detected in recording data, and then corrected according to the result of detection. As a result, higher-density recording is attainable.

In reading data recorded on the magneto-optical disk 10, the magnetic head 36 is not used. That is, the semiconductor laser 26 is driven by the laser drive circuit 66 to emit a laser beam having a reproducing power weaker than a recording power. The laser beam emitted from the laser 26 is focused on the magneto-optical disk 10 by the objective lens 18, and a reflected beam from the disk 10 is input through the objective lens 18 and the beam raising mirror or 45° right angle prism (not shown) into the beam splitter 68. The input beam is next reflected by the beam splitter 68 and received by a four-divided photodetector 78.

The reflected light from the magneto-optical disk 10 changes in its magnetic Kerr rotation according to the recorded data. Accordingly, by demodulating the magnetic Kerr rotation in a demodulating circuit 80, a reproduced signal is obtained. The light detected by the four-divided photodetector 78 is converted into electrical signals according to the light quantities. The electrical signals are next input through adders and a comparator into a focusing drive circuit 82, which in turn supplies a current to the focus coil 48 according to an error signal, thereby moving the objective lens 18 in the Z—Z direction shown in FIG. 3.

Further, the electrical signals from the four-divided photodetector 78 are also input through a comparator into a tracking drive circuit 84, which in turn supplies a current to the track coils 50 according to an error signal, thereby moving the optical head 16 in the Y—Y direction shown in FIG. 2. Further, a carriage drive circuit 74 supplies a current having a given direction and a given intensity to the carriage coils 22, thereby moving the carriage 14 in the X—X direction shown in FIG. 2 to seek a target track.

Figure 15:
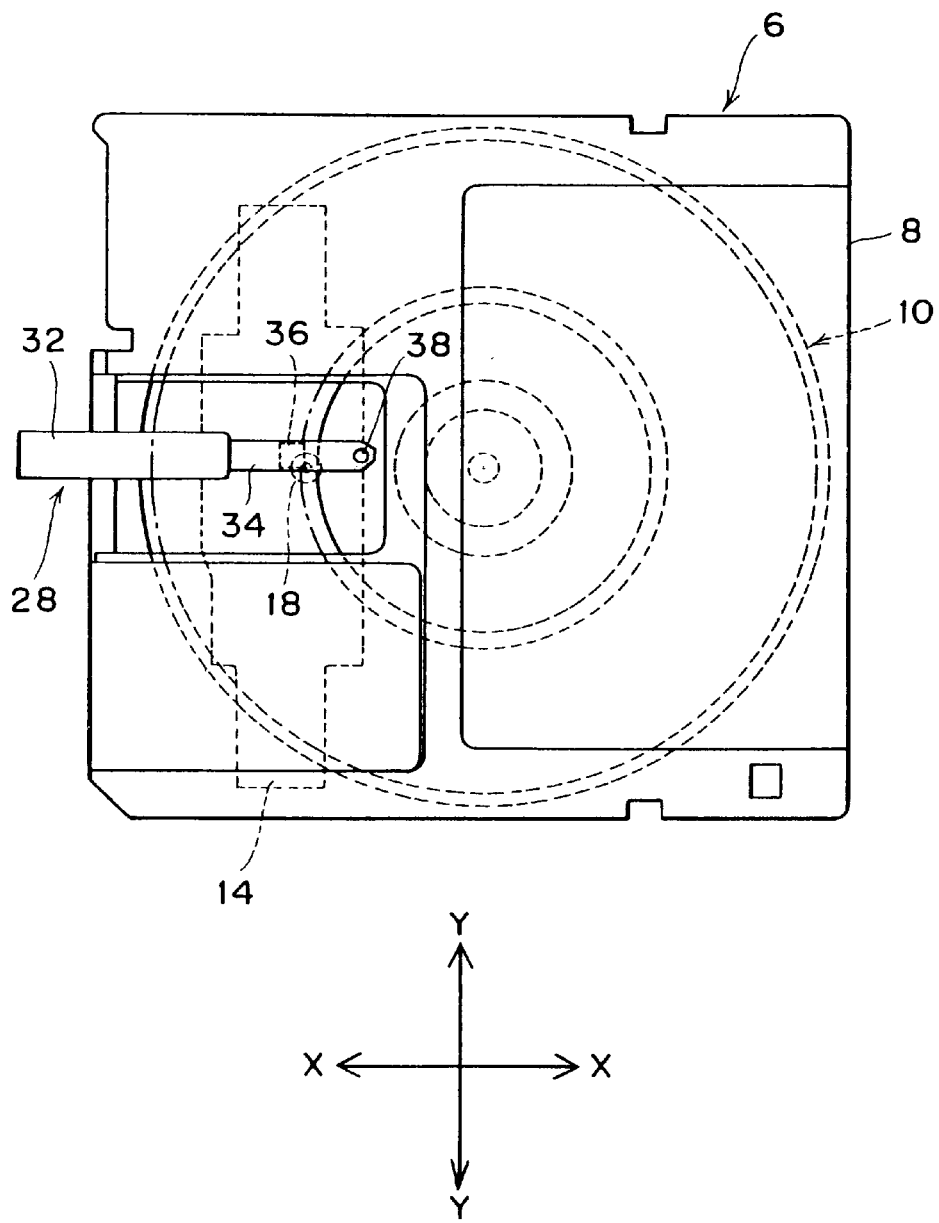
FIG. 15 is a plan view showing an essential part of a second preferred embodiment of the present invention.
Figure 16:
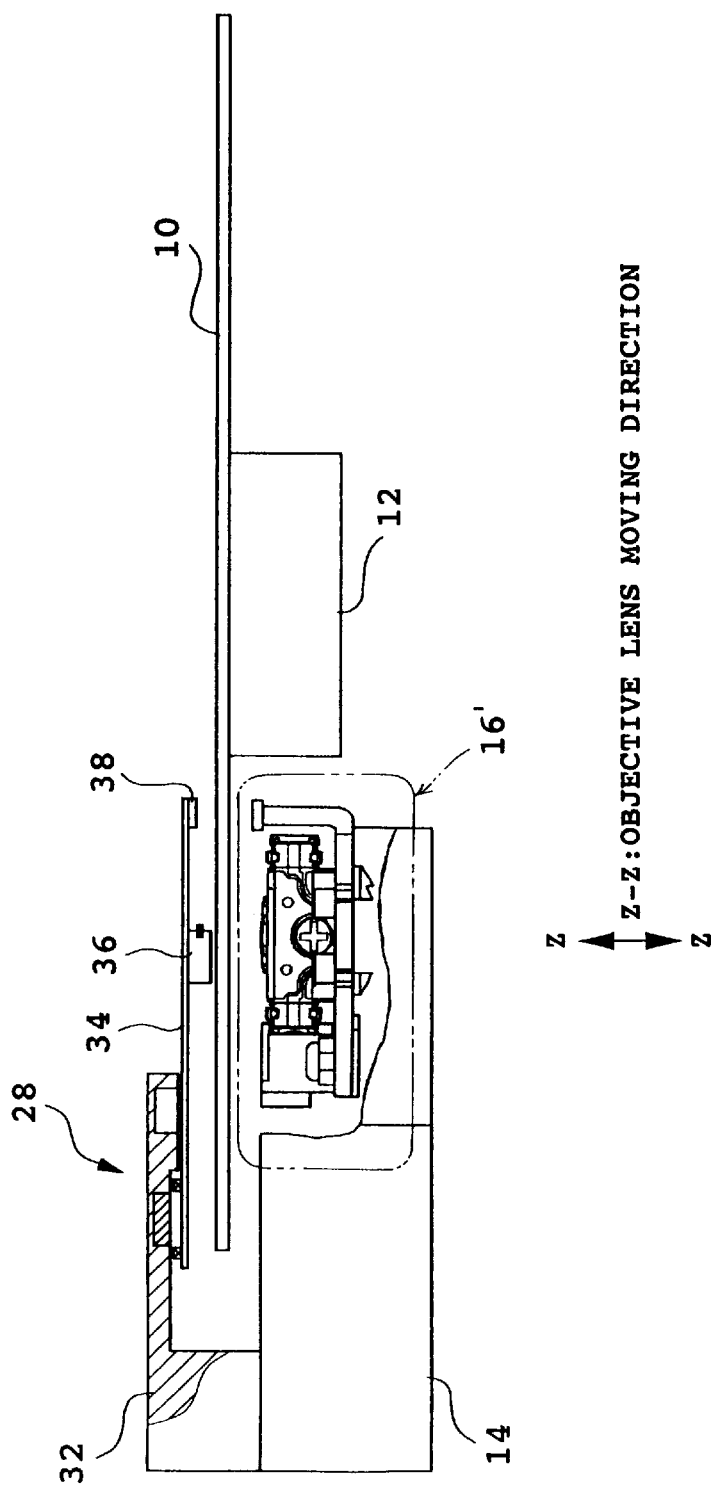
FIG. 16 is a partially-sectional elevation of the second preferred embodiment.
Figure 17:
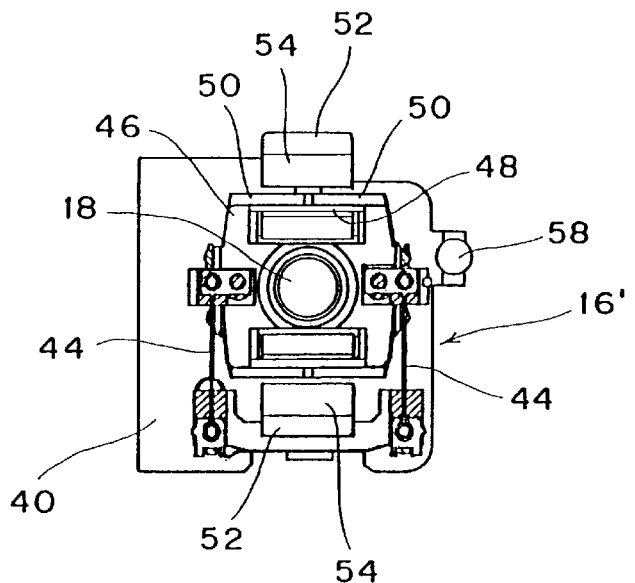
FIG. 17 is a plan view of an optical head used in the second preferred embodiment.
Figure 18:
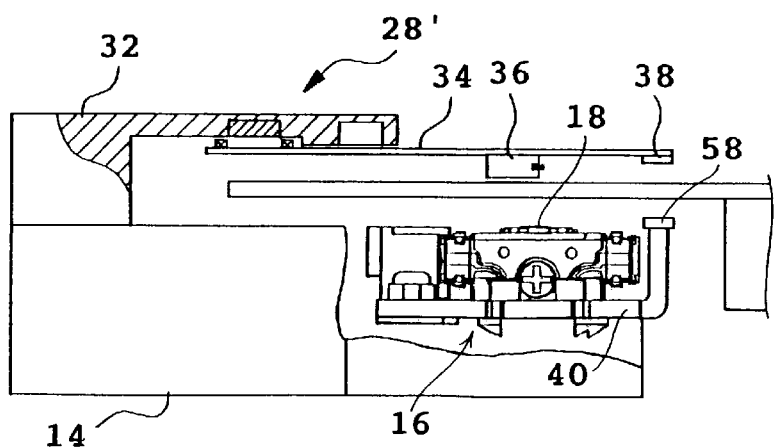
FIG. 18 is an enlarged partially-sectional elevation showing an essential part of the second preferred embodiment.
Figure 20:
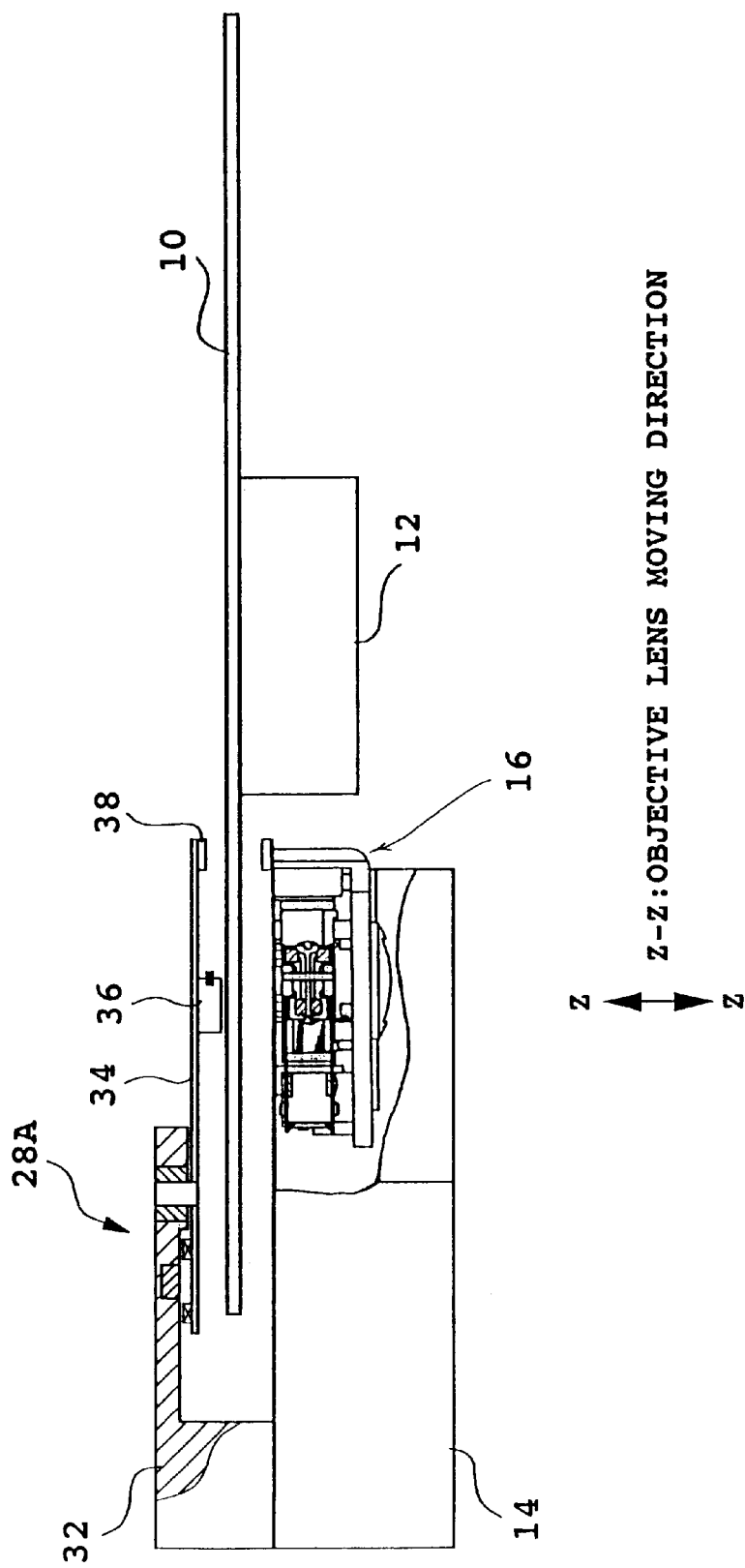
FIG. 20 is a partially-sectional elevation of the third preferred embodiment.

Referring to FIG. 15, there is shown a schematic plan view of a second preferred embodiment of the present invention. As shown in FIG. 17, an optical head 16' in the second preferred embodiment is oriented by counterclockwise 90° rotation of the optical head 16 shown in FIG. 4. The other configuration of this preferred embodiment is similar to that of the first preferred embodiment. By mounting the optical head 16' on the carriage 14 in the above positional relation, the carriage 14 and the optical head (actuator) 16' are movable in the X—X direction, and the magnetic head 36 is movable in the Y—Y direction.

Figure 21:
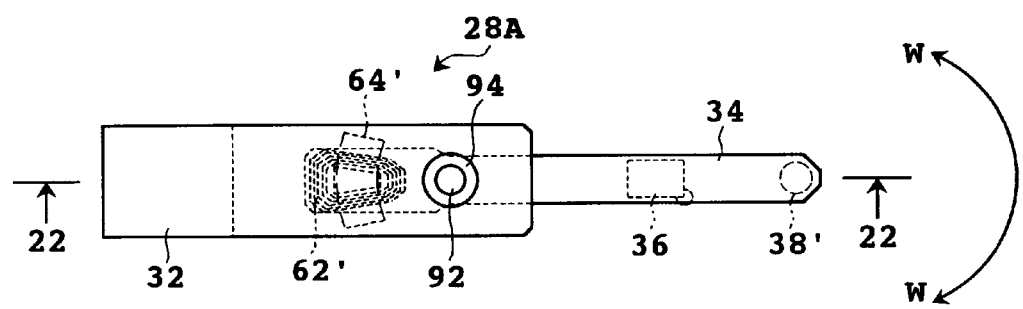
FIG. 21 is a top plan view of a magnetic head assembly used in the third preferred embodiment.
Figure 22:
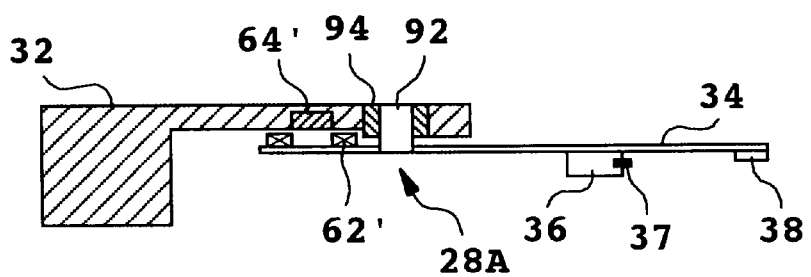
FIG. 22 is a cross section taken along the line 22—22 in FIG. 21.
Figure 24:
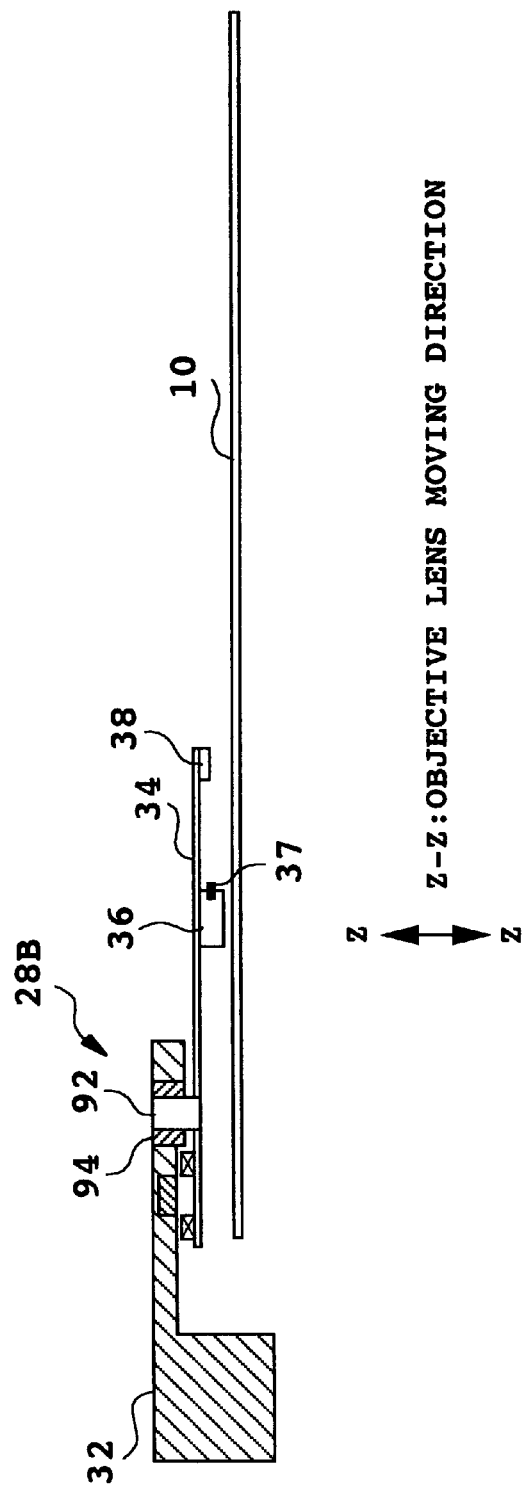
FIG. 24 is a sectional view showing a magnetic head assembly used in the fourth preferred embodiment.

Referring to FIG. 19, there is shown a schematic plan view of a third preferred embodiment of the present invention. As best shown in FIGS. 21 and 22, a magnetic head assembly 28A in this preferred embodiment is different from the magnetic head assembly 28 in the first preferred embodiment. That is, a sliding bearing 94 is press-fitted with a hole formed through the head arm 32, and a shaft 92 fixed to the suspension 34 is rotatably inserted in the sliding bearing 94.

A coil 62' is fixed to the base end portion of the suspension 34, and a magnet 64' is mounted in the head arm 32 at a position opposed to the coil 62'. The other configuration of this preferred embodiment is similar to that of the first preferred embodiment. In this manner, the suspension 34 is rotatably mounted on the head arm 32, thereby allowing a rotary motion of the magnetic head 36 about the shaft 92. As shown in FIG. 19, the carriage 14 is movable in the X—X direction, the actuator 16 is movable in the Y—Y direction, and the magnetic head 36 is movable in the W—W direction.

Figure 25:
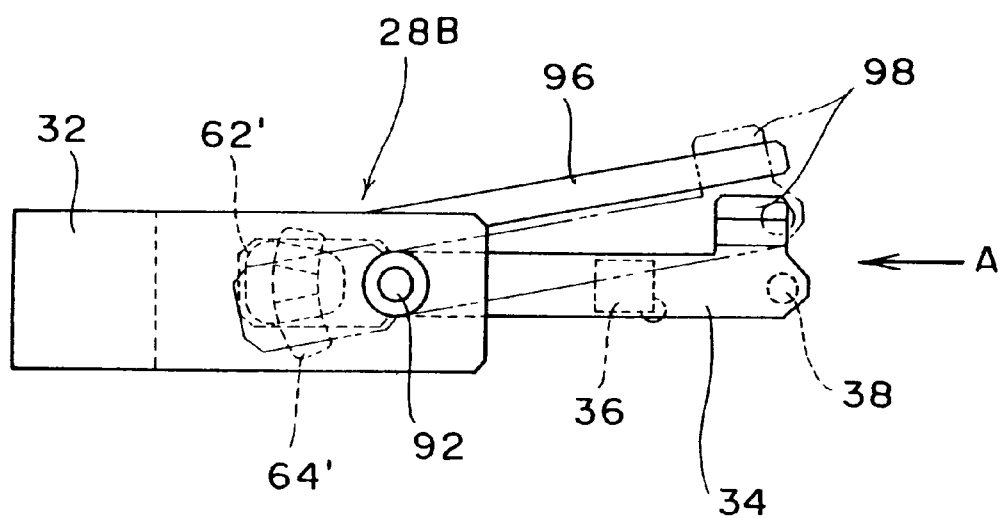
FIG. 25 is an enlarged top plan view of the magnetic head assembly in the fourth preferred embodiment.
Figure 26A:
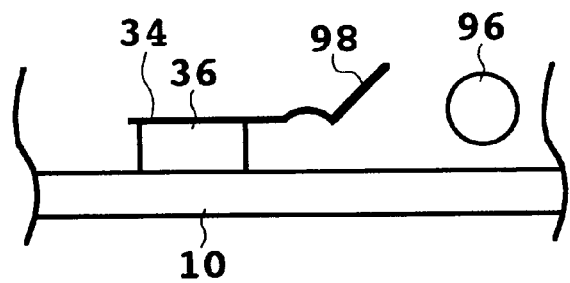
FIG. 26A is a view taken in the direction of an arrow A in FIG. 25, showing a condition where a suspension is not lifted by a rod.
Figure 26B:
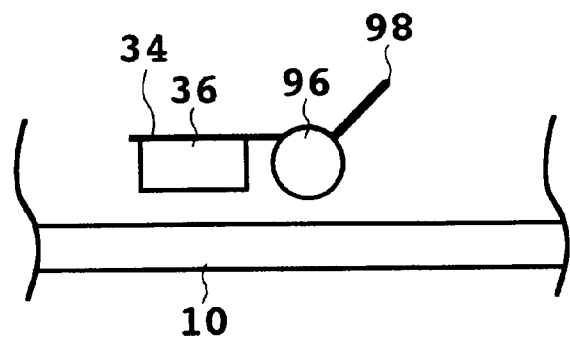
FIG. 26B is a view similar to FIG. 26A, showing a condition that the suspension is lifted by the rod.
Figure 28:
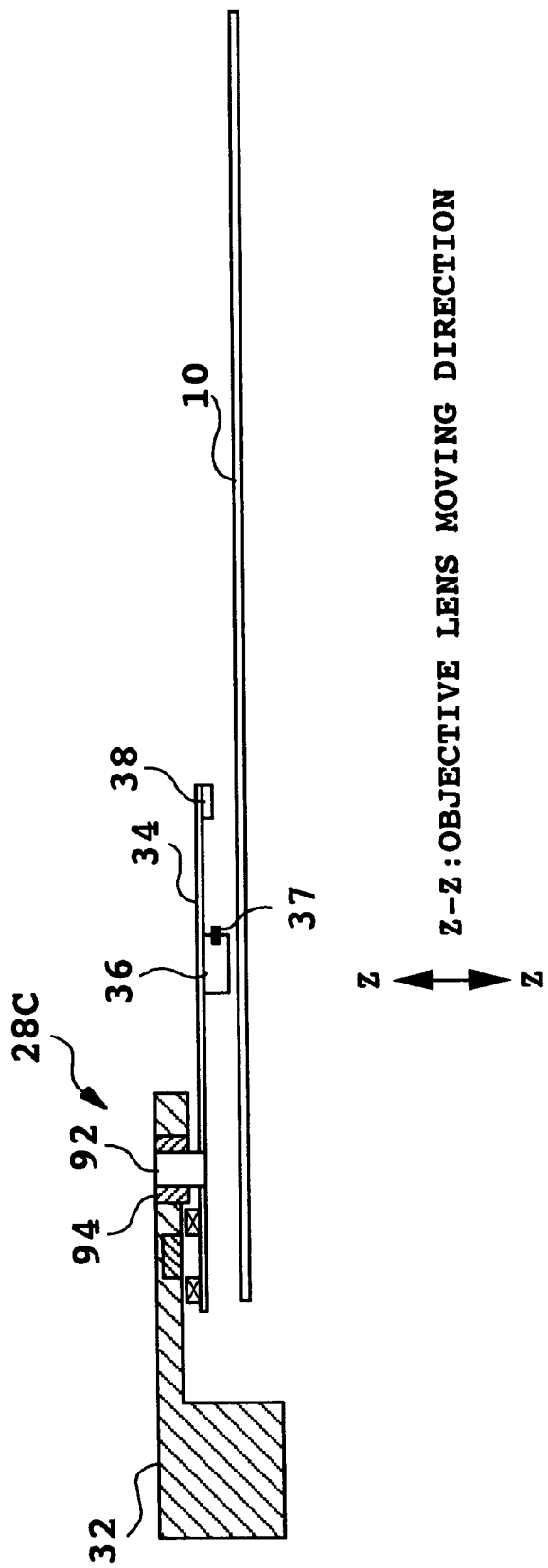
FIG. 28 is a sectional view showing a magnetic head assembly used in the fifth preferred embodiment.

Referring to FIG. 23, there is shown a schematic plan view of a fourth preferred embodiment of the present invention. This preferred embodiment is an improvement of the third preferred embodiment. A magnetic head assembly 28B in this preferred embodiment has a rotary structure such that the suspension 34 is rotatable relative to the head arm 32 like the third preferred embodiment, thereby ensuring a wide movable range of the magnetic head 36. As shown in FIG. 25, the magnetic head assembly 28B is characterized in that a rod 96 is fixed by press fit to the head arm 32, and the suspension 34 is integrally formed at its front end portion with a projection 98 adapted to engage the rod 96. When the suspension 34 is rotated a given angle or more relative to the head arm 32, the projection 98 of the suspension 34 comes into engagement with the rod 96 and is lifted by the rod 96, thereby lifting the magnetic head 36 from the disk 10. With this configuration, the magnetic head 36 can be kept retracted to a lifted position during any period of time other than a data writing duration, i.e., during standby and during reading data. Accordingly, the possibility of collision between the magnetic head 36 and the disk 10 can be reduced.

While the present invention is applied to a magnetic field modulation type of magneto-optical disk drive in the above preferred embodiments, it should be noted that the present invention is applicable also to an optical modulation type of or a magnetically induced super-resolution type of magneto-optical disk drive. Particularly in the magnetic super-resolution recording type, a magnetic field must be applied also in reproducing data, so that the magnetic head is retracted to the lifted position only during standby, whereas the magnetic head is loaded in writing data and in reading data. Further, also in the optical modulation type of magneto-optical disk drive, there is a possibility that a magnetic head may be used in consideration of future higher-density recording, so that the present invention is applicable also to such a type of magneto-optical disk drive.

Figure 29:
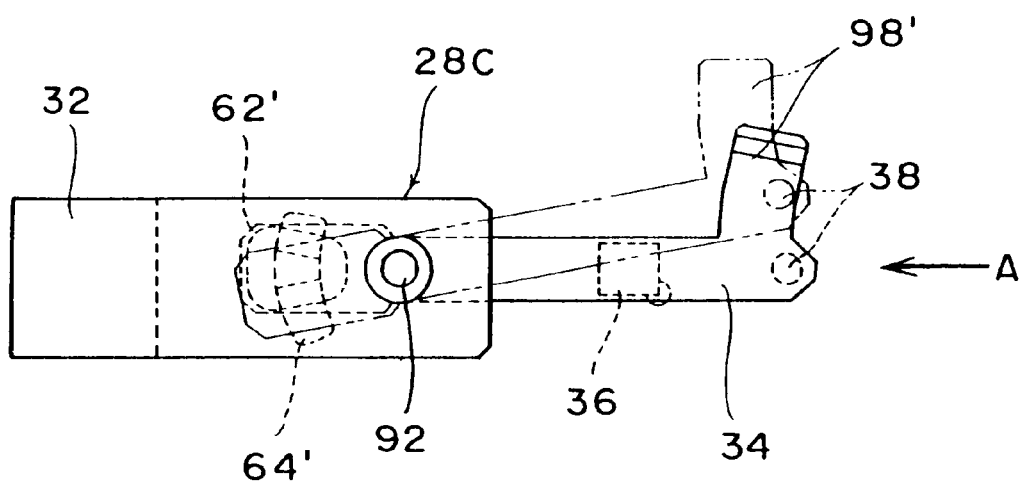
FIG. 29 is an enlarged top plan view of the magnetic head assembly in the fifth preferred embodiment.
Figure 30:
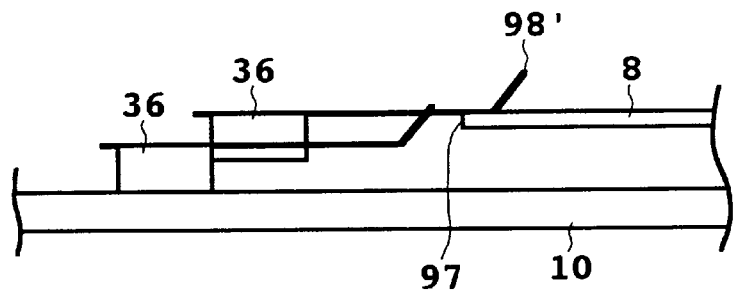
FIG. 30 is a view taken in the direction of an arrow A in FIG. 29.

Referring to FIG. 27, there is shown a schematic plan view of a fifth preferred embodiment of the present invention. As shown in FIG. 29, a magnetic head assembly 28C in this preferred embodiment is similar to the magnetic head assembly 28B in the fourth preferred embodiment in such a manner that the suspension 34 is integrally formed at its front end portion with a projection 98' with the exception that the rod 96 used in the fourth preferred embodiment is not provided. When the suspension 34 is rotated a given angle or more relative to the head arm 32, the projection 98' of the suspension 34 comes into engagement with an edge portion of the cartridge shell 8 defining a window 97 of the cartridge 6 and is lifted by this edge portion as shown in FIG. 30, thereby lifting the magnetic head 36 from the disk 10. Thus, this preferred embodiment can exhibit an effect similar to that of the fourth preferred embodiment.

Figure 31:
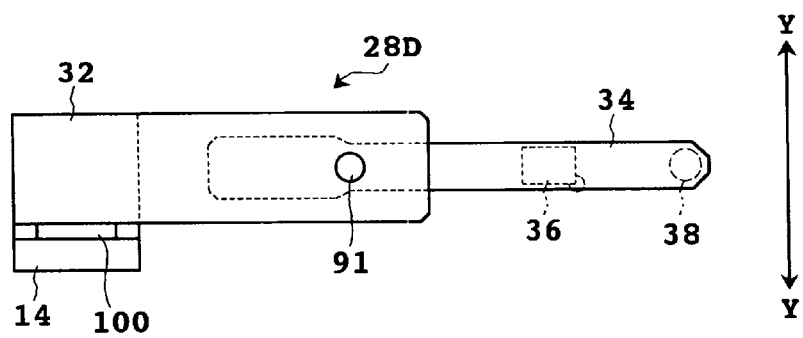
FIG. 31 is a top plan view of a magnetic head assembly used in a sixth preferred embodiment of the present invention.
Figure 32:
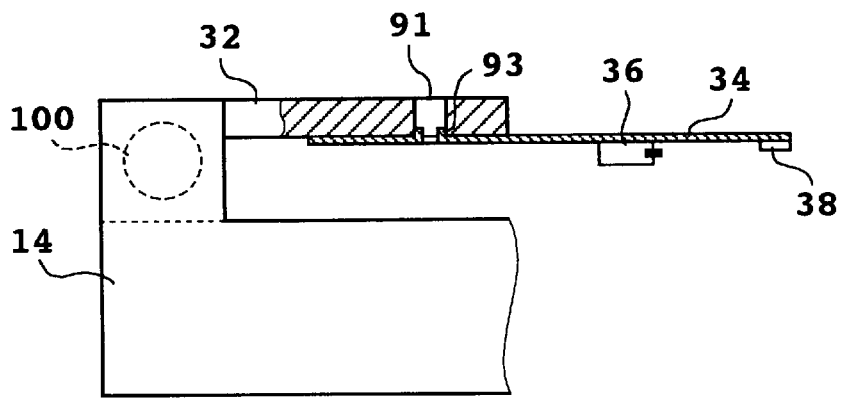
FIG. 32 is a partially-sectional elevation of the magnetic head assembly in the sixth preferred embodiment.

Referring to FIG. 31, there is shown a schematic plan view of a magnetic head assembly 28D according to a sixth preferred embodiment of the present invention. The magnetic head assembly 28D employs a piezoelectric element 100 as the actuator for the magnetic head 36 in place of a voice coil motor composed of the coil 62' and the magnet 64' used in the previous preferred embodiment. As shown in FIG. 32, the suspension 34 is integrally formed with a projection 93, and the head arm 32 is formed with a hole 91 for receiving the projection 93. The projection 93 is fixedly inserted in the hole 91 by crimping, thus fixing the suspension 34 to the head arm 32. As shown in FIG. 31, the head arm 32 is supported through the piezoelectric element 100 to the carriage 14. Accordingly, by applying a voltage corresponding to a difference (misalignment) signal (a−b) output from the photodetector 38 to the piezoelectric element 100, the head arm 32 is moved by the piezoelectric element 100 in the Y—Y direction shown in FIG. 31. The magnetic head 36 is also moved in the Y—Y direction because the suspension 34 is fixed to the head arm 32.

Figure 33:
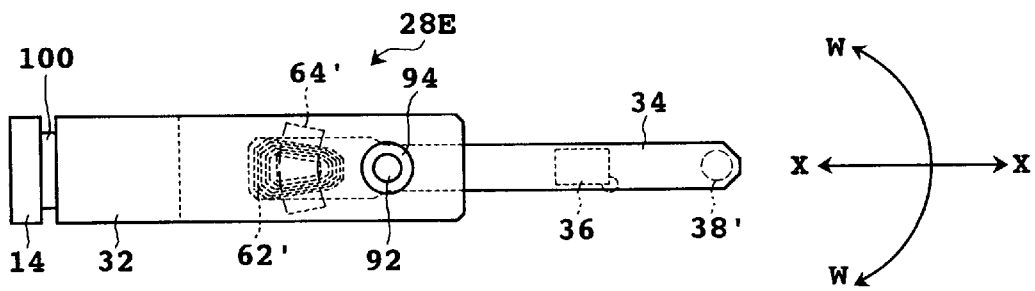
FIG. 33 is a top plan view of a magnetic head assembly used in a seventh preferred embodiment of the present invention.
Figure 34:
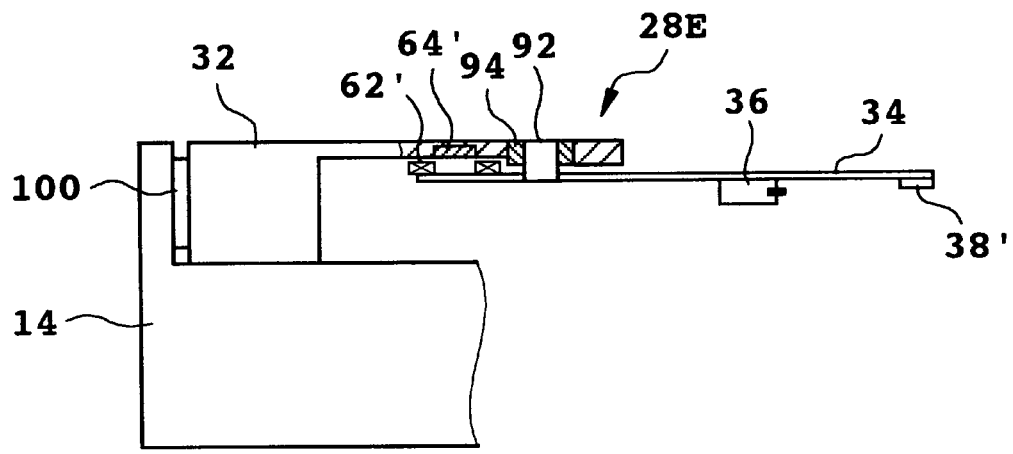
FIG. 34 is a partially-sectional elevation of the magnetic head assembly in the seventh preferred embodiment.
Figure 35:
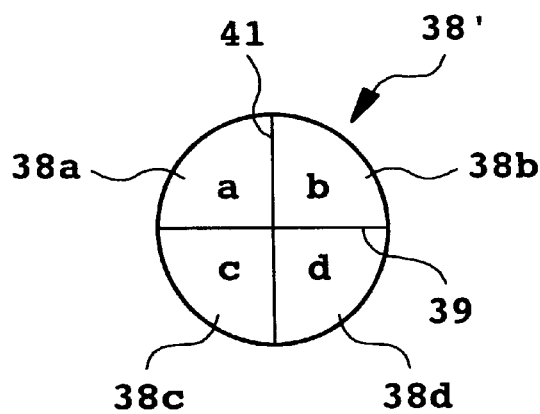
FIG. 35 is an enlarged plan view of a photodetector used in the seventh preferred embodiment.

FIG. 33 shows a schematic plan view of a magnetic head assembly 28E according to a seventh preferred embodiment of the present invention. The magnetic head assembly 28E employs both the voice coil motor and the piezoelectric element 100 as the actuator for the magnetic head 36. The suspension 34 is rotatably supported through a sliding bearing 94 to the head arm 32, so that the magnetic head 36 is rotatable in the W—W direction shown in FIG. 33 by the voice coil motor composed of the coil 62' fixed to the suspension 34 and the magnet 64' mounted on the head arm 32.

Further, the head arm 32 is supported through the piezoelectric element 100 to the carriage 14. Accordingly, by applying a voltage to the piezoelectric element 100, the head arm 32, i.e., the magnetic head 36 is moved in the X—X direction shown in FIG. 33. Thus, a two-directional misalignment of the magnetic head 36 relative to the optical head 16 can be corrected. Also in the case that the moving directions of the optical head 16 and the magnetic head 36 are perpendicular to each other as in the second preferred embodiment, the two-directional misalignment can be corrected. Additionally, the magnetic head assembly 28E in this preferred embodiment includes a four-divided photodetector 38' in place of the two-divided photodetector 38 used in the previous preferred embodiment. The four-divided photodetector 38' is composed of four portions 38a, 38b, 38c, and 38d partitioned by two division lines 39 and 41, thereby obtaining finer misalignment correction signals.

Figure 36:
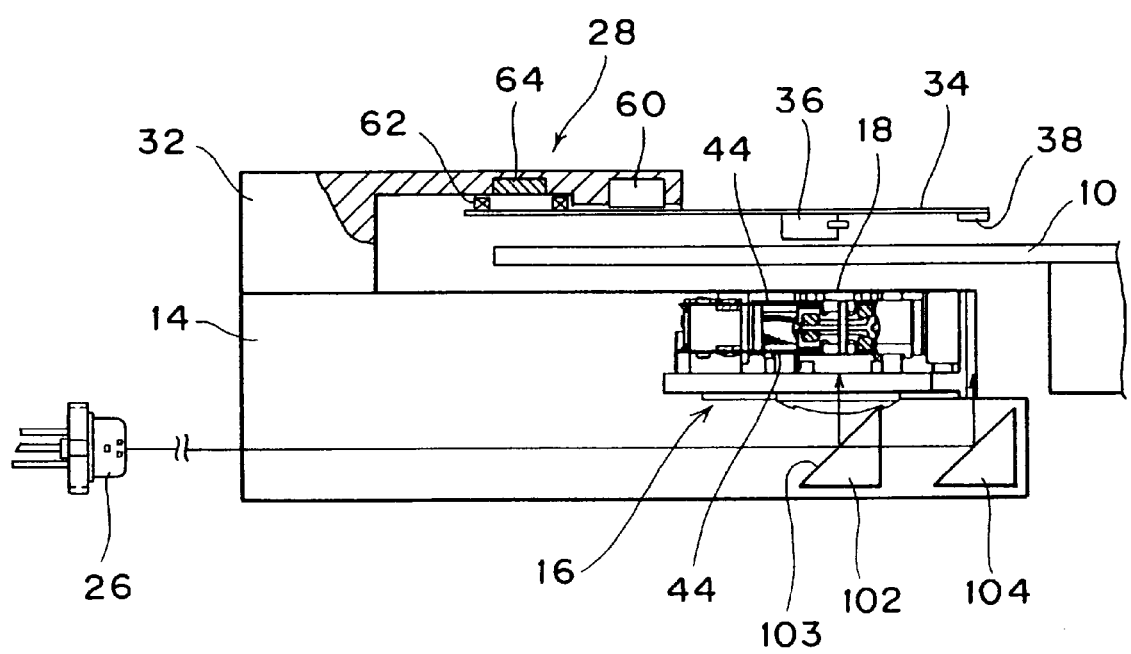
FIG. 36 is a partially-sectional elevation of an eighth preferred embodiment of the present invention.

Referring to FIG. 36, there is shown a partially-sectional elevation of an eighth preferred embodiment of the present invention. Two beam raising mirrors or 45° right angle prisms 102 and 104 are located below the optical head 16. The 45° right angle prism 102 has a coupler coating 103 capable of reflecting about 90% of a laser beam emitted from the semiconductor laser 26 and transmitting about 10% of the laser beam. On the other hand, the 45° right angle prism 104 is positioned just under the photodetector 38 to totally reflect the transmitted light through the prism 102 toward the photodetector 38. Accordingly, about 90% of a laser beam emitted from the semiconductor laser 26 is reflected by the prism 102 toward the objective lens 18, and about 10% of the laser beam is transmitted by the prism 102. A transmitted beam through the prism 102 is totally reflected by the prism 104 and passed through the transparent portion 10b (see FIG. 2) of the disk 10 to reach the photodetector 38, thereby detecting a difference in light quantity. According to this preferred embodiment, the light emitting element 58 used in each previous preferred embodiment can be eliminated.

Figure 37:
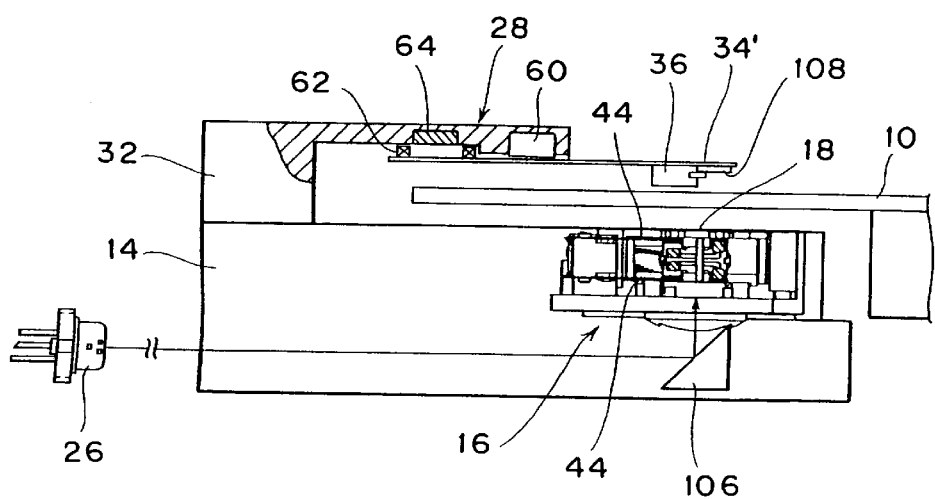
FIG. 37 is a partially-sectional elevation of a ninth preferred embodiment of the present invention.
Figure 38:
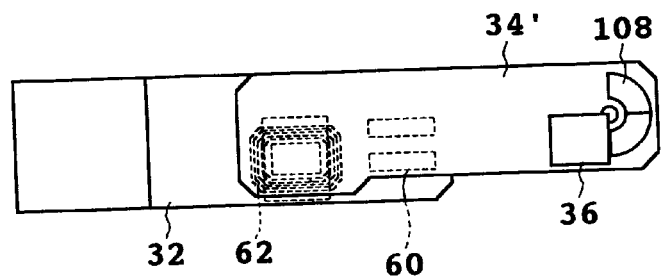
FIG. 38 is a bottom plan view of a magnetic head assembly used in the ninth preferred embodiment.

Referring to FIG. 37, there is shown a partially-sectional elevation of a ninth preferred embodiment of the present invention. A single beam raising mirror 106 is located below the optical head 16. A laser beam from the semiconductor laser 26 is totally reflected by the beam raising mirror or 45° right angle prism 106 toward the objective lens 18. The laser beam transmitted through the objective lens 18 is utilized for detection of a misalignment between the optical head 16 and the magnetic head 36. A photodetector 108 for receiving a part of the laser beam reflected by the prism 106 is mounted on the suspension 34' at a position adjacent to the magnetic head 36. As shown in FIG. 38, the photodetector 108 has a specific shape not interfering with the magnetic head 36, so as to detect the laser beam once focused on the disk 10 by the objective lens 18 and then passed through the transparent portion 10b of the disk 10 as spreading in beam diameter.

Figure 39:
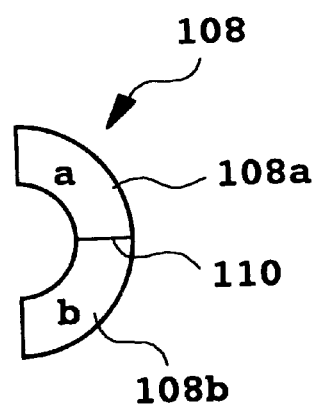
FIG. 39 is an enlarged plan view of a photodetector used in the ninth preferred embodiment.

Further, since the photodetector 108 is positioned adjacent to the magnetic head 36, the misalignment between the optical head 16 and the magnetic head 36 is detected and corrected after moving the carriage 14 so as to locate the objective lens 18 under the transparent portion 10b of the disk 10. As shown in FIG. 39, the photodetector 108 is composed of two portions 108a and 108b partitioned by a division line 110.

In the above preferred embodiments except the eighth and ninth preferred embodiments, the photodetector 38 and the light emitting element 58 are located near the front end of the magnetic head assembly, i.e., on the spindle motor side. Accordingly, the longitudinal dimension of the disk drive can be reduced as compared with the case that the misalignment detecting means is located near the rear end of the magnetic head assembly, i.e., on the fixed optical system side.

According to the present invention as described above, a misalignment between the magnetic head and the optical head used for magneto-optical recording can be detected and corrected during operation of the disk drive, thereby allowing higher-density recording. While the misalignment may be detected always during operation of the disk drive, it may be detected with given timing. For example, the misalignment may be detected and corrected with a specific timing such as in loading a recording medium into the disk drive, before carrying out recording or reproduction, during waiting for a command from a host device, at predetermined time intervals with a timer, or upon change in temperature of the disk drive with a thermometer.

Since the misalignment detecting means is provided near the front end of the magnetic head assembly, the longitudinal dimension of the magneto-optical disk drive need not be increased to mount the misalignment detecting means. Further, since the magneto-optical disk drive includes the mechanism for retracting the magnetic head from the disk surface during standby and during reading information, the reliability of the magneto-optical disk drive can be improved.

What is claimed is:

1. An information storage device comprising:
   a carriage;
   an optical head mounted on said carriage, said optical head having an objective lens and an actuator for moving said objective lens;
   first driving means for moving said carriage in a first direction;
   a magnetic head assembly mounted on said carriage and having a magnetic head;
   a light emitting element mounted on said optical head; and
   a photodetector mounted on said magnetic head assembly for detecting light emitted from said light emitting element;
   wherein a misalignment between said optical head and said magnetic head is detected by using said photodetector and said light emitted from said light emitting element, and further wherein said misalignment between said optical head and said magnetic head is detected when said light emitting element and said photodetector are located at a position corresponding to a transparent portion of an information recording medium loaded into said information storage device; and
   second driving means for moving said magnetic head to correct said misalignment between said optical head and said magnetic head.

2. An information storage device according to claim 1, wherein said transparent portion is formed as an inner circumferential portion of said information recording medium.

3. An information storage device according to claim 1, wherein:
   said magnetic head assembly includes a head arm fixed to said carriage, a suspension elastically supported to said head arm, and said magnetic head fixed to said suspension; and
   said second driving means includes a coil mounted on said suspension and a permanent magnet mounted on said head arm.

4. An information storage device according to claim 3, further comprising a leaf spring for elastically supporting said suspension to said head arm.

5. An information storage device according to claim 3, wherein said suspension is elastically supported to said head arm by a spring portion integral with said suspension.

6. An information storage device according to claim 1, wherein:
   said magnetic head assembly includes a head arm fixed to said carriage, a suspension rotatably supported to said head arm, and said magnetic head fixed to said suspension; and
   said second driving means includes a coil mounted on said suspension and a permanent magnet mounted on said head arm.

7. An information storage device according to claim 6, further comprising a lifting mechanism for lifting said magnetic head from said information recording medium when said suspension is rotated a given angle or more relative to said head arm.

8. An information storage device according to claim 7, wherein said lifting mechanism keeps lifting said magnetic head from said information recording medium during standby and during reading data recorded on said information recording medium, whereas allowing a free motion of said magnetic head only during writing data onto said information recording medium.

9. An information storage device according to claim 7, wherein said lifting mechanism keeps lifting said magnetic head during standby.

10. An information storage device according to claim 7, wherein said lifting mechanism comprises a rod fixed to said head arm.

11. An information storage device according to claim 7, wherein said lifting mechanism comprises a cartridge shell containing said information recording medium.

12. An information storage device according to claim 1, wherein:
   said magnetic head assembly includes a head arm, a suspension fixed to said head arm, and said magnetic head fixed to said suspension; and
   said second driving means includes a piezoelectric element fixed between said carriage and said head arm.

13. An information storage device according to claim 1, wherein:
   said magnetic head assembly includes a head arm, a suspension rotatably supported to said head arm, and said magnetic head fixed to said suspension; and
   said second driving means includes a piezoelectric element fixed between said carriage and said head arm, a coil mounted on said suspension, and a permanent magnet mounted on said head arm.

14. An information storage device comprising:

a carriage;

an optical head mounted on said carriage, said optical head having an objective lens and an actuator for moving said objective lens;

first driving means for moving said carriage in a first direction;

a magnetic head assembly mounted on said carriage and having a magnetic head;

a light emitting element mounted on said optical head; and a photodetector mounted on said magnetic head assembly for detecting light emitted from said light emitting element;

wherein a misalignment between said optical head and said magnetic head is detected by using said photodetector and said light emitted from said light emitting element, and further wherein said misalignment between said optical head and said magnetic head is detected when said light emitting element and said photodetector are located at a position corresponding to a transparent portion of an information recording medium loaded into said information storage device; and wherein said misalignment detected is corrected by driving said actuator to move said objective lens.

15. An information storage device according to claim 14, wherein said objective lens is moved by said actuator in the same direction as said first direction.

16. An information storage device according to claim 14, wherein said objective lens is moved by said actuator in a direction perpendicular to said first direction.

17. An information storage device comprising:

a carriage;

a laser light source for emitting a laser beam;

an optical head mounted on said carriage, said optical head having an objective lens, a first 45° right angle prism for reflecting a first part of said laser beam toward said objective lens and transmitting a second part of said laser beam, an actuator for moving said objective lens, and a second 45° right angle prism for totally reflecting said second part of said laser beam transmitted through the first 45° right angle prism;

first driving means for moving said carriage in a first direction;

a magnetic head assembly mounted on said carriage and having a magnetic head; and a photodetector mounted on said magnetic head assembly for detecting said second part of said laser beam reflected by said second 45° right angle prism;

wherein a misalignment between said optical head and said magnetic head is detected by using said photodetector and said second part of said laser beam reflected by said second 45° right angle prism.

18. An information storage device according to claim 17, wherein said misalignment between said optical head and said magnetic head is detected when the second 45° right angle prism and said photodetector are located at a position corresponding to a transparent portion of an information recording medium loaded into said information storage device.

19. An information storage device according to claim 18, wherein said transparent portion is formed as an inner circumferential portion of said information recording medium.

20. An information storage device according to claim 18, further comprising second driving means for moving said magnetic head to correct said misalignment between said optical head and said magnetic head.

21. An information storage device comprising:

a carriage;

a laser light source for emitting a laser beam;

an optical head mounted on said carriage, said optical head having an objective lens, a 45° right angle prism for totally reflecting said laser beam toward said objective lens, and an actuator for moving said objective lens;

first driving means for moving said carriage in a first direction;

a magnetic head assembly mounted on said carriage and having a magnetic head;

a photodetector mounted on said magnetic head assembly at a position adjacent to said magnetic head for detecting said laser beam reflected by said 45° right angle prism and transmitted through said objective lens, wherein a misalignment between said optical head and said magnetic head is detected by using said photodetector and said laser beam transmitted through said objective lens, and further wherein said misalignment between said optical head and said magnetic head is detected when said 45° right angle prism and said photodetector are located at a position corresponding to a transparent portion of an information recording medium loaded into said information storage device; and second driving means for moving said magnetic head to correct said misalignment between said optical head and said magnetic head.

22. An information storage device according to claim 14, wherein said transparent portion is formed as an inner circumferential portion of said information recording medium.

23. An information storage device according to claim 21, wherein said transparent portion is formed as an inner circumferential portion of said information recording medium.

* * * * *